United States Patent
Damnjanovic et al.

(10) Patent No.: US 9,674,727 B2
(45) Date of Patent: Jun. 6, 2017

(54) INDICATION OF CELL MODE AND CSI FEEDBACK RULES FOR CELL ON-OFF PROCEDURE

(71) Applicant: QUALCOMM Incorporated, San Diego, CA (US)

(72) Inventors: Aleksandar Damnjanovic, Del Mar, CA (US); Peter Gaal, San Diego, CA (US); Wanshi Chen, San Diego, CA (US); Tao Luo, San Diego, CA (US); Hao Xu, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 187 days.

(21) Appl. No.: 14/567,855

(22) Filed: Dec. 11, 2014

(65) Prior Publication Data
US 2015/0208269 A1    Jul. 23, 2015

Related U.S. Application Data

(60) Provisional application No. 61/928,948, filed on Jan. 17, 2014.

(51) Int. Cl.
| | | |
|---|---|---|
| *H04W 24/10* | (2009.01) | |
| *H04L 1/00* | (2006.01) | |
| *H04L 5/00* | (2006.01) | |

(52) U.S. Cl.
CPC ........... *H04W 24/10* (2013.01); *H04L 1/0023* (2013.01); *H04L 1/0026* (2013.01);
(Continued)

(58) Field of Classification Search
None
See application file for complete search history.

(56) References Cited

U.S. PATENT DOCUMENTS

2009/0095513 A1* 4/2009 Oshika ................... H01L 24/29
174/257
2011/0116467 A1* 5/2011 Jung ................... H04L 25/4917
370/329
(Continued)

FOREIGN PATENT DOCUMENTS

| CA | WO 2011053856 A2 * | 5/2011 | ............. H04L 5/001 |
|---|---|---|---|
| EP | 2747492 A2 | 6/2014 | |

(Continued)

OTHER PUBLICATIONS

Hitachi Ltd., "Discovery Procedures for Small Cell On/Off Switching," 3GPP TSG RAN WG1 Meeting #74bis, Guangzhou, China, R1-134760, Oct. 7-11, 2013, 4 pgs., XP_50717810A, 3rd Generation Partnership Project.

(Continued)

*Primary Examiner* — Andrew Lai
*Assistant Examiner* — Jamaal Henson
(74) *Attorney, Agent, or Firm* — Anthony R. Morris

(57) ABSTRACT

Methods, systems, and devices are described for dynamic cell mode indication and reporting channel and interference feedback for dormant cells in a carrier aggregation environment. Indicators of cell mode for one or more secondary cells are sent using a transmission mechanism and may configure active or dormant sub-periods within the indicated periods. Indicators of cell mode for a secondary cell may be transmitted on a carrier of the primary cell, or the indicators may be transmitted on carriers of the secondary cell. Dormancy may also be indicated by the presence or absence of a cell mode indicator for predetermined time periods. When CSI measurements occur for a carrier of a dormant cell, the UE may report CSI for the dormant periods, suppress CSI reporting for the dormant periods, adjust a reporting fre-
(Continued)

quency for the dormant periods, or report some types of CSI and not others for the dormant periods.

51 Claims, 16 Drawing Sheets

(52) U.S. Cl.
CPC ............ *H04L 1/0027* (2013.01); *H04L 5/001* (2013.01); *H04L 5/0098* (2013.01)

(56) References Cited

U.S. PATENT DOCUMENTS

| | | | |
|---|---|---|---|
| 2011/0128901 A1 | 6/2011 | Lee et al. | |
| 2011/0190017 A1 | 8/2011 | Kwon et al. | |
| 2011/0268087 A1* | 11/2011 | Kwon | H04L 5/0005 370/331 |
| 2011/0269490 A1 | 11/2011 | Earnshaw et al. | |
| 2011/0312316 A1 | 12/2011 | Baldemair et al. | |
| 2012/0093103 A1 | 4/2012 | Lee et al. | |
| 2012/0176884 A1 | 7/2012 | Zhang et al. | |
| 2012/0176926 A1* | 7/2012 | Jang | H04W 24/02 370/252 |
| 2012/0224470 A1 | 9/2012 | Jeong et al. | |
| 2012/0250578 A1 | 10/2012 | Pani et al. | |
| 2012/0275398 A1 | 11/2012 | Chen et al. | |
| 2012/0281544 A1 | 11/2012 | Anepu et al. | |
| 2012/0282942 A1 | 11/2012 | Uusitalo et al. | |
| 2013/0010964 A1 | 1/2013 | Fong et al. | |
| 2013/0022014 A1* | 1/2013 | Hong | H04L 5/001 370/329 |
| 2013/0077523 A1 | 3/2013 | Ko et al. | |
| 2013/0107743 A1 | 5/2013 | Ishii et al. | |
| 2013/0121185 A1 | 5/2013 | Li et al. | |
| 2013/0148534 A1 | 6/2013 | Jung et al. | |
| 2013/0148535 A1 | 6/2013 | Baghel et al. | |
| 2013/0148613 A1* | 6/2013 | Han | H04L 1/0026 370/329 |
| 2013/0176952 A1 | 7/2013 | Shin et al. | |
| 2013/0237208 A1 | 9/2013 | Vujcic | |
| 2013/0250881 A1 | 9/2013 | Liao et al. | |
| 2014/0010131 A1 | 1/2014 | Gaal et al. | |
| 2014/0092761 A1 | 4/2014 | Behravan et al. | |
| 2014/0105056 A1 | 4/2014 | Li et al. | |
| 2014/0177557 A1 | 6/2014 | Charbit et al. | |
| 2014/0192740 A1 | 7/2014 | Ekpenyong et al. | |
| 2014/0192775 A1 | 7/2014 | Li et al. | |
| 2015/0049649 A1 | 2/2015 | Zhu et al. | |
| 2015/0215929 A1 | 7/2015 | Damnjanovic et al. | |

FOREIGN PATENT DOCUMENTS

| | | |
|---|---|---|
| WO | WO-2013025160 A1 | 2/2013 |
| WO | WO-2013044957 A1 | 4/2013 |

OTHER PUBLICATIONS

ISA/EPO, International Search Report and Written Opinion of the International Searching Authority, Int'l Appl. No. PCT/US2014/069964, Aug. 11, 2015, European Patent Office, Rijswijk, NL, 20 pgs.

Qualcomm Incorporated, "Small Cell On/Off," 3GPP TSG-RAN WG1 #74bis, Guangzhou, China, R1-134617, Oct. 7-11, 2013, 5 pgs., XP_50717702A, 3rd Generation Partnership Project.

3GPP, "3rd Generation Partnership Project; Technical Specification Group Radio Access Network; Small Cell Enhancements for E-UTRA and E-UTRAN—Physical Layer Aspects (Release 12)," 3GPP TR 36.872 v1.0.0 (Aug. 2013) Technical Report, Aug. 2013, Cover and p. 45 (section 7.2.2.2), XP-002739844, 3rd Generation Partnership Project.

3GPP, "3rd Generation Partnership Project; Technical Specification Group Radio Access Network; Evolved Universal Terrestrial Radio Access (E-UTRA); Medium Access Control (MAC) Protocol Specification (Release 11)," 3GPP TS 36.321 v11.1.0 (Dec. 2012) Technical Specification, Dec. 2012, Cover and p. 34, XP-002739843, 3rd Generation Partnership Project.

ISA/EPO, Partial International Search Report of the International Searching Authority, Int'l Appl. No. PCT/US2014/069964, Jun. 1, 2015, European Patent Office, Rijswijk, NL, 5 pgs.

NTT DOCOMO, "Small Cell Discovery for Efficient Small Cell On/Off Operation," 3GPP TSG RAN WG1 Meeting #74, R1-133457, Barcelona, Spain, Aug. 19-23, 2013, 8 pgs., 3rd Generation Partnership Project.

\* cited by examiner

INDICATION OF CELL MODE AND CSI FEEDBACK RULES FOR CELL ON-OFF PROCEDURE

CROSS REFERENCES

The present application for patent claims priority to U.S. Provisional Patent Application No. 61/928,948 by Damnjanovic et al., entitled "Indication of Cell Mode and CSI Feedback Rules for Cell On-Off Procedure," filed Jan. 17, 2014, assigned to the assignee hereof, and expressly incorporated by reference herein.

BACKGROUND

Field of the Disclosure

The following relates generally to wireless communication, and more specifically to cell mode indication and reporting for dormant cells in a carrier aggregation environment.

Description of Related Art

Wireless communications systems are widely deployed to provide various types of communication content such as voice, video, packet data, messaging, broadcast, and so on. These systems may be multiple-access systems capable of supporting communication with multiple users by sharing the available system resources (e.g., time, frequency, and power). Examples of such multiple-access systems include code-division multiple access (CDMA) systems, time-division multiple access (TDMA) systems, frequency-division multiple access (FDMA) systems, and orthogonal frequency-division multiple access (OFDMA) systems.

Generally, a wireless multiple-access communications system may include a number of base stations, each simultaneously supporting communication for multiple mobile devices. Base stations may communicate with mobile devices on downstream and upstream links. Each base station has a coverage range, which may be referred to as the coverage area of the cell. In some cases the coverage area may be subdivided into multiple cells. Also, in some cases, a base station may transmit multiple component carriers on different portions of available spectrum. These component carriers may also be referred to as cells.

A UE may be served by more than one carrier. In some cases a UE may be served by multiple carriers transmitted from a single base station, in other cases, a UE may be served by multiple carriers transmitted from more than one base station. When more than one carrier is configured to serve a UE, there may be periods where one or more of the configured carriers may not transmit data to the UE. Continuing to transmit control information or reference signals when a carrier does not have data to transmit to the UE may result in inefficient use of resources for the base station and the UE. For example, the base station may use transmit power to transmit the signals and the UE may use battery and processing power to receive the transmitted signals.

SUMMARY

The described features generally relate to one or more improved systems, methods, or apparatuses for dynamic cell mode indication and reporting channel and interference feedback for dormant cells in a carrier aggregation environment. In some embodiments, indicators of cell mode for carriers for one or more secondary cells are sent (e.g., periodically or aperiodically) using a transmission mechanism (e.g., broadcast, unicast, multicast, etc.) and may configure active or dormant sub-periods within the indicated periods. Indicators of cell mode for a secondary cell may be transmitted on carriers of the primary cell, or the indicators may be transmitted on carriers of the secondary cell, in some cases. Dormancy for predetermined time periods may also be indicated by the presence or absence of a cell mode indicator.

Some embodiments are directed to managing channel state information (CSI) reporting for dormant secondary cells. When CSI measurements occur for a carrier associated with a dormant secondary cell, the UE may report CSI for the dormant periods, suppress CSI reporting for the dormant periods, adjust a reporting frequency (e.g., for periodic reporting) for the dormant periods, or report some types of CSI and not others for the dormant periods (e.g., report periodic and suppress aperiodic, etc.). Reported CSI may be based on the CSI measurements when the secondary cell was dormant or based on prior CSI measurements made when the secondary cell was active.

A method of wireless communications is described, comprising: monitoring a carrier from among a primary carrier and one or more secondary carriers for an indication that at least one secondary carrier is dormant; and determining, based on the indication, whether the at least one secondary carrier is dormant.

An apparatus for wireless communications is also described, comprising: means for monitoring a carrier from among a primary carrier and one or more secondary carriers for an indication that at least one secondary carrier is dormant; and means for determining, based on the indication, whether the at least one secondary carrier is dormant.

An apparatus for wireless communications is also described, comprising: a processor; a memory in electronic communication with the processor; and instructions stored in the memory, the instructions being executable by the processor to: monitor a carrier from among a primary carrier and one or more secondary carriers for an indication that at least one secondary carrier is dormant; and determine, based on the indication, whether the at least one secondary carrier is dormant.

A non-transitory computer-readable medium storing instructions for wireless communications executable to: monitor a carrier from among a primary carrier and one or more secondary carriers for an indication that at least one secondary carrier is dormant; and determine, based on the indication, whether the at least one secondary carrier is dormant.

A method, apparatus and non-transitory computer-readable medium as above is also described wherein determining whether the at least one secondary carrier is dormant comprises: determining, based on a presence of the indication, that the at least one secondary carrier is dormant for a predetermined time period.

A method, apparatus and non-transitory computer-readable medium as above is also described, wherein determining whether the at least one secondary carrier is dormant comprises: determining, based on an absence of a carrier mode indicator, that the at least one secondary carrier is dormant for a predetermined time period.

A method, apparatus and non-transitory computer-readable medium as above is also described, wherein monitoring the carrier comprises: monitoring a search space of the carrier at a predefined time interval for downlink control information (DCI) comprising the indication.

A method, apparatus and non-transitory computer-readable medium as above is also described, wherein the predetermined time period comprises one or more radio frames.

A method, apparatus and non-transitory computer-readable medium as above is also described, wherein the carrier comprises the carrier monitored for the indication.

A method, apparatus and non-transitory computer-readable medium as above is also described, wherein the at least one secondary carrier and the carrier monitored for the indication comprise different carriers.

A method, apparatus and non-transitory computer-readable medium as above is also described, wherein monitoring for the indication is based on an activation state of the at least one secondary carrier.

A method of wireless communication is described, comprising: determining that at least one secondary carrier is dormant; and determining a channel state information (CSI) reporting configuration for the at least one secondary carrier based at least in part on the determination that the at least one secondary carrier is dormant.

An apparatus for wireless communication is also described, comprising: means for determining that at least one secondary carrier is dormant; and means for determining a channel state information (CSI) reporting configuration for the at least one secondary carrier based at least in part on the determination that the at least one secondary carrier is dormant.

An apparatus for wireless communication is also described, comprising: a processor; a memory in electronic communication with the processor; and instructions stored in the memory, the instructions being executable by the processor to: determine that at least one secondary carrier is dormant; and determine a channel state information (CSI) reporting configuration for the at least one secondary carrier based at least in part on the determination that the at least one secondary carrier is dormant.

A non-transitory computer-readable medium storing instructions for wireless communication executable to: determine that at least one secondary carrier is dormant; and determine a channel state information (CSI) reporting configuration for the at least one secondary carrier based at least in part on the determination that the at least one secondary carrier is dormant.

A method, apparatus and non-transitory computer-readable medium as above is also described, wherein the CSI reporting configuration comprises: suppressing CSI reporting for the at least one secondary carrier for one or more of periodic CSI reporting or aperiodic CSI reporting, or a combination thereof.

A method, apparatus and non-transitory computer-readable medium as above is also described, wherein the CSI reporting configuration comprises: reporting CSI for a first dormant time period of the at least one secondary carrier based on channel measurements of the at least one secondary carrier during at least one time period when the at least one secondary carrier was non-dormant.

A method, apparatus and non-transitory computer-readable medium as above is also described, wherein the CSI reporting configuration further comprises averaging the channel measurements from the at least one time period.

A method, apparatus and non-transitory computer-readable medium as above is also described, further comprising: determining a CSI reference signal (CSI-RS) measurement configuration for the at least one secondary carrier for a dormant time period of the at least one secondary carrier; performing CSI-RS measurements for the at least one secondary carrier during the dormant time period according to the CSI-RS measurement configuration; and reporting CSI for the dormant time period based on the CSI-RS measurements and the determined CSI reporting configuration.

A method, apparatus and non-transitory computer-readable medium as above is also described, wherein the determining the CSI-RS measurement configuration comprises: determining a schedule for CSI-RS transmissions on the at least one secondary carrier based at least in part on a discovery reference signal configuration for the at least one secondary carrier.

A method, apparatus and non-transitory computer-readable medium as above is also described, further comprising: measuring at least one CSI-RS of a neighboring secondary carrier during a dormant time period of the at least one secondary carrier; and reporting CSI based on the at least one CSI-RS measurement of the neighboring secondary carrier and the determined CSI reporting configuration.

A method, apparatus and non-transitory computer-readable medium as above is also described, wherein the neighboring secondary carrier is identified for measuring the at least one CSI-RS during the dormant time period based at least in part on a physical cell index of the neighboring secondary carrier.

A method, apparatus and non-transitory computer-readable medium as above is also described, wherein the CSI reporting configuration comprises: reporting CSI based on measurements for the at least one secondary carrier during a dormant time period of the at least one secondary carrier.

A method, apparatus and non-transitory computer-readable medium as above is also described, wherein the reported CSI comprises one or more of channel measurements of the at least one secondary carrier, interference measurements of the at least one secondary carrier, or a combination thereof.

A method of wireless communication is described, comprising: establishing, at a base station, a configuration for communication with at least one user equipment (UE) using a plurality of carriers including a primary carrier and one or more secondary carriers; and indicating to the at least one UE that at least one secondary carrier from the one or more secondary carriers is dormant.

An apparatus for wireless communication is also described, comprising: means for establishing, at a base station, a configuration for communication with at least one user equipment (UE) using a plurality of carriers including a primary carrier and one or more secondary carriers; and means for indicating to the at least one UE that at least one secondary carrier from the one or more secondary carriers is dormant.

An apparatus for wireless communication is described, comprising: a processor; a memory in electronic communication with the processor; and instructions stored in the memory, the instructions being executable by the processor to: establish, at a base station, a configuration for communication with at least one user equipment (UE) using a plurality of carriers including a primary carrier and one or more secondary carriers; and indicate to the at least one UE that at least one secondary carrier from the one or more secondary carriers is dormant.

A non-transitory computer-readable medium storing instructions for wireless communication executable to: establish, at a base station, a configuration for communication with at least one user equipment (UE) using a plurality of carriers including a primary carrier and one or more secondary carriers; and indicate to the at least one UE that at least one secondary carrier from the one or more secondary carriers is dormant.

A method, apparatus and non-transitory computer-readable medium as above is also described, wherein indicating that the at least one secondary carrier from the one or more secondary carriers is dormant comprises: transmitting an indication that the at least one secondary carrier from the one or more secondary carriers is dormant for a predetermined time period.

A method, apparatus and non-transitory computer-readable medium as above is also described, wherein transmitting the indication comprises: transmitting downlink control information (DCI) in a search space associated with the one or more secondary carriers.

A method, apparatus and non-transitory computer-readable medium as above is also described, wherein the search space comprises a common search space for the at least one UE.

A method, apparatus and non-transitory computer-readable medium as above is also described, wherein the DCI is transmitted according to DCI Format 1C.

A method, apparatus and non-transitory computer-readable medium as above is also described, wherein transmitting the indication comprises: transmitting the indication by a carrier different from the at least one secondary carrier.

A method, apparatus and non-transitory computer-readable medium as above is also described, wherein transmitting the indication comprises: transmitting the indication by the at least one secondary carrier.

A method, apparatus and non-transitory computer-readable medium as above is also described, wherein indicating that the at least one secondary carrier from the one or more secondary carriers is dormant comprises: omitting transmission of a periodic indication that the at least one secondary carrier from the one or more secondary carriers is non-dormant.

A method of wireless communication is described, comprising: identifying, at a first base station, a first user equipment (UE) configured for communication using a primary carrier and a secondary carrier; determining that the secondary carrier is dormant; and adjusting a schedule for transmitting a reference signal on the secondary carrier for at least one dormant time period of the secondary carrier.

An apparatus for wireless communication is also described, comprising: means for identifying, at a first base station, a first user equipment (UE) configured for communication using a primary carrier and a secondary carrier; means for determining that the secondary carrier is dormant; and means for adjusting a schedule for transmitting a reference signal on the secondary carrier for at least one dormant time period of the secondary carrier.

An apparatus for wireless communication is described, comprising: a processor; a memory in electronic communication with the processor; and instructions stored in the memory, the instructions being executable by the processor to: identify, at a first base station, a first user equipment (UE) configured for communication using a primary carrier and a secondary carrier; determine that the secondary carrier is dormant; and adjust a schedule for transmitting a reference signal on the secondary carrier for at least one dormant time period of the secondary carrier.

A non-transitory computer-readable medium storing instructions for wireless communication executable to: identify, at a first base station, a first user equipment (UE) configured for communication using a primary carrier and a secondary carrier; determine that the secondary carrier is dormant; and adjust a schedule for transmitting a reference signal on the secondary carrier for at least one dormant time period of the secondary carrier.

A method, apparatus and non-transitory computer-readable medium as above is also described, wherein the reference signal comprises one or more of a cell-specific reference signal (CRS), a channel state information reference signal (CSI-RS), a positioning reference signal (PRS), or a combination thereof.

A method, apparatus and non-transitory computer-readable medium as above is also described, wherein adjusting the schedule comprises: reducing a temporal frequency of transmission of the reference signal based on determining that the secondary carrier is dormant.

A method, apparatus and non-transitory computer-readable medium as above is also described, wherein the adjusting the schedule for transmitting the reference signal comprises determining a transmission schedule for a channel state information reference signal (CSI-RS) based on a discovery reference signal configuration for the secondary carrier.

A method, apparatus and non-transitory computer-readable medium as above is also described, wherein the primary carrier is transmitted by a second base station.

A method, apparatus and non-transitory computer-readable medium as above is also described, further comprising: receiving at least one channel state information (CSI) report from the UE, wherein the at least one CSI report comprises information related to a neighboring secondary carrier for the dormant time period of the secondary carrier.

Further scope of the applicability of the described methods and apparatuses will become apparent from the following detailed description, claims, and drawings. The detailed description and specific examples are given by way of illustration only, since various changes and modifications within the spirit and scope of the description will become apparent to those skilled in the art.

BRIEF DESCRIPTION OF THE DRAWINGS

A further understanding of the nature and advantages of the present invention may be realized by reference to the following drawings. In the appended figures, similar components or features may have the same reference label. Further, various components of the same type may be distinguished by following the reference label by a dash and a second label that distinguishes among the similar components. If only the first reference label is used in the specification, the description is applicable to any one of the similar components having the same first reference label irrespective of the second reference label.

DETAILED DESCRIPTION

Systems, methods, or apparatuses are described for dynamic cell mode indication and reporting channel and interference feedback for dormant cells in a carrier aggregation environment. In some embodiments, indicators of cell mode for one or more secondary cells are sent, such as periodically or aperiodically, using a transmission mechanism (e.g., broadcast, unicast, multicast, etc.) and may configure active or dormant sub-periods within the indicated periods. Indicators of cell mode for a secondary cell may be transmitted on carriers of the primary cell, or the indicators may be transmitted on carriers of the secondary cell, in some cases. Dormancy for predetermined time periods may also be indicated by the presence or absence of a cell mode indicator.

Some embodiments are directed to managing channel state information (CSI) reporting for dormant secondary cells. When CSI measurements occur for a carrier associated with a dormant secondary cell, the UE may report CSI for the dormant periods, suppress CSI reporting for the dormant periods, adjust a reporting frequency (e.g., for periodic reporting) for the dormant periods, or report some types of CSI and not others for the dormant periods (e.g., report periodic and suppress aperiodic, etc.). Reported CSI may be based on the CSI measurements when the secondary cell was dormant or based on prior CSI measurements made when the secondary cell was active.

The following description provides examples, and is not limiting of the scope, applicability, or configuration set forth in the claims. Changes may be made in the function and arrangement of elements discussed without departing from the spirit and scope of the disclosure. Various embodiments may omit, substitute, or add various procedures or components as appropriate. For instance, the methods described may be performed in an order different from that described, and various steps may be added, omitted, or combined. Also, features described with respect to certain embodiments may be combined in other embodiments.

Figure 1:
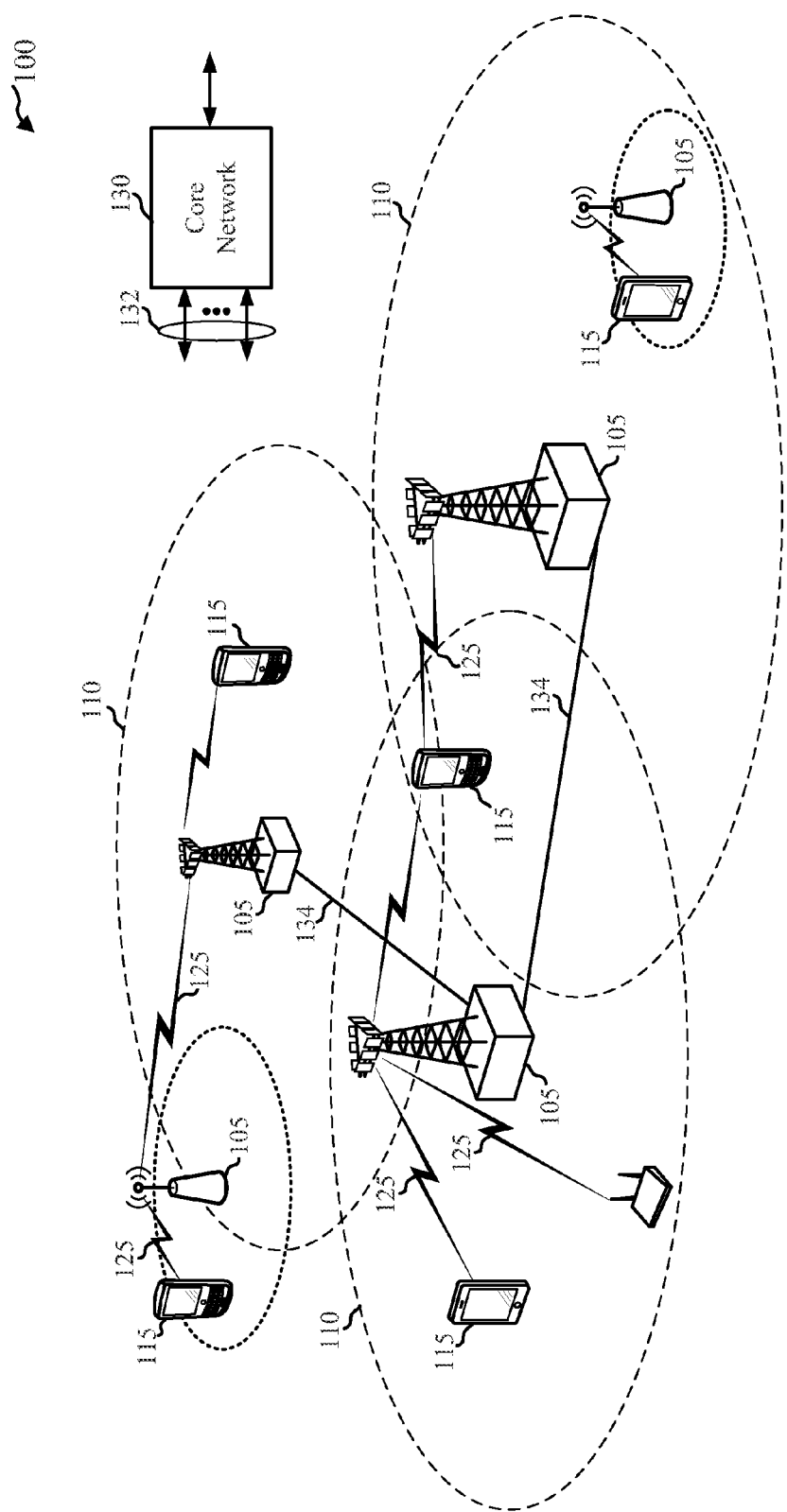
FIG. 1 illustrates an example of a wireless communications system in accordance with various embodiments.

FIG. 1 illustrates an example of a wireless communications system 100 in accordance with various embodiments. The system 100 includes base stations 105, communication devices, also known as a user equipment (UE) 115, and a core network 130. The base stations 105 may communicate with the communication devices 115 under the control of a base station controller (not shown), which may be part of the core network 130 or the base stations 105 in various embodiments. Base stations 105 may communicate control information or user data with the core network 130 through backhaul links 132. In embodiments, the base stations 105 may communicate, either directly or indirectly, with each other over backhaul links 134, which may be wired or wireless communication links. The system 100 may support operation on multiple carriers (waveform signals of different frequencies). Multi-carrier transmitters can transmit modulated signals simultaneously on the multiple carriers. For example, each communication link 125 may be a multi-carrier signal modulated according to the various radio technologies described above. Each modulated signal may be sent on a different carrier and may carry control information (e.g., reference signals, control channels, etc.), overhead information, data, etc.

The base stations 105 may wirelessly communicate with the devices 115 via one or more base station antennas. Each of the base station 105 sites may provide communication coverage for a respective geographic area 110. In some embodiments, base stations 105 may be referred to as a base transceiver station, a radio base station, an access point, a radio transceiver, a basic service set (BSS), an extended service set (ESS), a NodeB, eNodeB (eNB), Home NodeB, a Home eNodeB, or some other suitable terminology. The coverage area 110 for a base station may be divided into sectors making up only a portion of the coverage area (not shown). The term "cell" is a 3GPP term that can be used to describe a base station, carriers associated with a base station, or a coverage area (e.g., sector, etc.) of a base station. The system 100 may include base stations 105 of different types (e.g., macro, micro, or pico base stations). There may be overlapping coverage areas for different technologies.

In embodiments, the system 100 is an LTE/LTE-A network. In LTE/LTE-A networks, the terms evolved Node B (eNB) and UE may be generally used to describe the base stations 105 and devices 115, respectively. The system 100 may be a Heterogeneous LTE/LTE-A network in which different types of eNBs provide coverage for various geographical regions. For example, each eNB 105 may provide communication coverage for a macro cell, a pico cell, a femto cell, or other types of cells. A macro cell generally covers a relatively large geographic area (e.g., several kilometers in radius) and may allow unrestricted access by UEs with service subscriptions with the network provider. A pico cell would generally cover a relatively smaller geographic area and may allow unrestricted access by UEs with service subscriptions with the network provider. A femto cell would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). An eNB for a macro cell may be referred to as a macro eNB. An eNB for a pico cell may be referred to as a pico eNB. And, an eNB for a femto cell may be referred to as a femto eNB or a home eNB. An eNB may support one or multiple (e.g., two, three, four, and the like) cells.

The core network 130 may communicate with the eNBs 105 via a backhaul 132 (e.g., S1, etc.). The eNBs 105 may also communicate with one another, e.g., directly or indirectly via backhaul links 134 (e.g., X2, etc.) or via backhaul links 132 (e.g., through core network 130). The wireless communications system 100 may support synchronous or asynchronous operation. For synchronous operation, the eNBs may have similar frame timing, and transmissions from different eNBs may be approximately aligned in time. For asynchronous operation, the eNBs may have different frame timing, and transmissions from different eNBs may not be aligned in time. The techniques described herein may be used for either synchronous or asynchronous operations.

The communication networks that may accommodate some of the various disclosed embodiments may be packet-based networks that operate according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use Hybrid ARQ (HARD) to provide retransmission at the MAC layer to improve link efficiency. In the control plane, the Radio Resource Control (RRC) protocol layer may provide establishment, configuration, and maintenance of an RRC connection between the UE and the network used for the user plane data. At the Physical layer, the transport channels may be mapped to Physical channels.

The UEs 115 are dispersed throughout the wireless communications system 100, and each UE may be stationary or mobile. A UE 115 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology. A UE 115 may be a cellular phone, a personal digital assistant (PDA), a wireless modem, a wireless communication device, a handheld device, a tablet computer, a laptop computer, a cordless phone, a wireless local loop (WLL) station, or the like. A UE may be able to communicate with macro eNBs, pico eNBs, femto eNBs, relays, and the like.

The communication links 125 shown in system 100 may include uplink (UL) transmissions from a UE 115 to a base station 105 over UL carriers, or downlink (DL) transmissions, from a base station 105 to a UE 115 over DL carriers. The downlink transmissions may also be called forward link transmissions while the uplink transmissions may also be called reverse link transmissions. In some cases, more than one carrier may be used to transmit data to a UE. In some cases, a UE may receive transmissions from more than one base station. The carriers may transmit bidirectional communications using FDD (e.g., using paired spectrum resources) or TDD operation (e.g., using unpaired spectrum resources). Frame structures for FDD (e.g., frame structure type 1) and TDD (e.g., frame structure type 2) may be defined.

Figure 2:
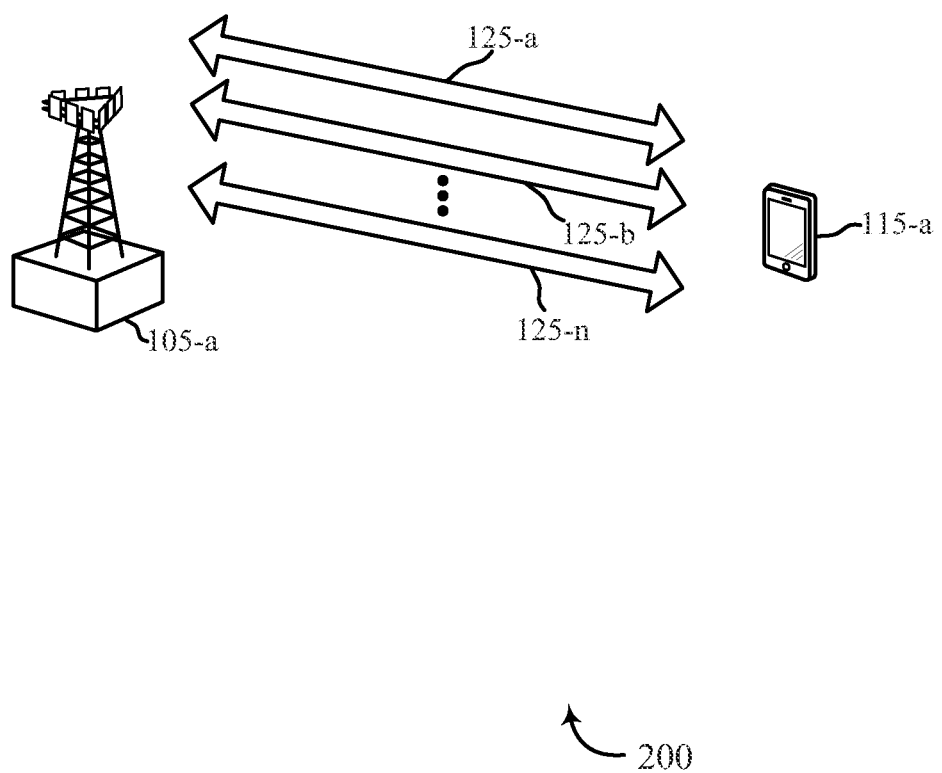
FIG. 2 illustrates an example of a wireless communications system with multiple component carriers serving a UE in accordance with various embodiments.

FIG. 2 illustrates an example of a wireless communications system 200 with a UE 115-a served by multiple links 125 (e.g., links 125-a, 125-b, 125-n, etc.) in accordance with various embodiments. The multiple links 125 may be configured according to a carrier aggregation scheme. In a carrier aggregation scheme, each of the links 125 may correspond to one or more component carriers (CCs). In one embodiment, link 125-a may be one or more primary carriers (e.g., primary cell or PCell) and other links (e.g., 125-b, 125-n, etc.) may be one or more secondary carriers (e.g., secondary cells or SCells). The PCell may include a primary downlink CC and an uplink primary CC. An SCell may include a secondary downlink CC and, if configured, a secondary uplink CC. Control information including scheduling for SCells may be performed on the SCell or on a different cell (PCell or SCell). In some cases, both PCell 125-a and SCells 125-b, 125-n are supported by the same base station 105-a. In other cases, PCell 125-a may be supported by one base station 105-a and one or more SCells 125 may be supported by a different base station 105 (not shown). The techniques described herein may be applied to a carrier aggregation scheme with a PCell and any number of SCells supported by one or more base stations 105.

In some cases, SCells are activated and deactivated for individual UEs 115 by a configuring cell using a primary carrier (e.g., PCell, etc.). SCell activation and deactivation may be carried in MAC signaling. When an SCell is deactivated, the UE 115 does not need to receive the corresponding downlink CC, cannot transmit in the corresponding uplink CC, nor is it required to perform channel quality information (CQI) measurements. Conversely, when an SCell is active, the UE 115 receives control information or data transmissions for the SCell, and is expected to be able to perform CQI measurements. The activation/deactivation mechanism is based on the combination of a MAC control element and deactivation timers. The MAC control element carries a bitmap for the individual activation and deactivation of SCells such that SCells can be activated and deactivated individually, and a single activation/deactivation command can activate/deactivate a subset of the SCells. Generally, one deactivation timer is maintained per SCell. In some cases, all the timers for a UE may be configured with a common value via RRC. However, the UEs are not limited to one timer per SCell, or to all timers being configured with a common value.

An SCell may be configured to serve one or more UEs 115, but in some cases may not have data to transmit to the UEs 115. In some cases, the SCell may go into a dormant state for time periods when no data is scheduled. When dormant, a cell may transmit sparse overhead signals and channels on the downlink carrier sufficient for a radio resource control (RRC) connected UE to detect, measure, and report the dormant carrier to the primary cell.

During dormant periods of an SCell, the SCell could be deactivated for each UE served by the SCell. However, cell activation/deactivation is not an efficient mechanism to support notification of cell dormancy, nor is cell activation/deactivation able to support dynamic cell dormancy on the order of frame or subframe periods. For example, separate activation/deactivation commands are sent to each UE served by the SCell, which take up significant resources and may take several subframes or more for notification of each served UE. Furthermore, because UEs are not performing CQI measurements for deactivated SCells, reactivation of a fully dormant cell may be a relatively slow process.

The systems of FIGS. 1 and 2, including the base stations 105 or UEs 115, may be configured for dynamic cell mode indication and reporting channel and interference feedback for dormant cells in a carrier aggregation environment. In some embodiments, indicators of cell mode for carriers for one or more SCells are sent, such as periodically or aperiodically, using a transmission mechanism (e.g., broadcast, unicast, multicast, etc.) and may configure active or dormant sub-periods within the indicated periods. Indicators of cell mode for an SCell may be transmitted on carriers of the PCell, or the indicators may be transmitted on carriers of the SCell, in some cases. Dormancy for predetermined time periods may also be indicated by the presence or absence of a cell mode indicator.

Some embodiments are directed to managing channel state information (CSI) reporting for dormant SCells. When CSI measurements occur for a carrier associated with a dormant SCell, the UE may report CSI for the dormant periods, suppress CSI reporting for the dormant periods, adjust a reporting frequency (e.g., for periodic reporting) for the dormant periods, or report some types of CSI and not others for the dormant periods (e.g., report periodic and suppress aperiodic, etc.). Reported CSI may be based on the CSI measurements when the SCell was dormant or based on prior CSI measurements made when the SCell was active.

Figure 3:
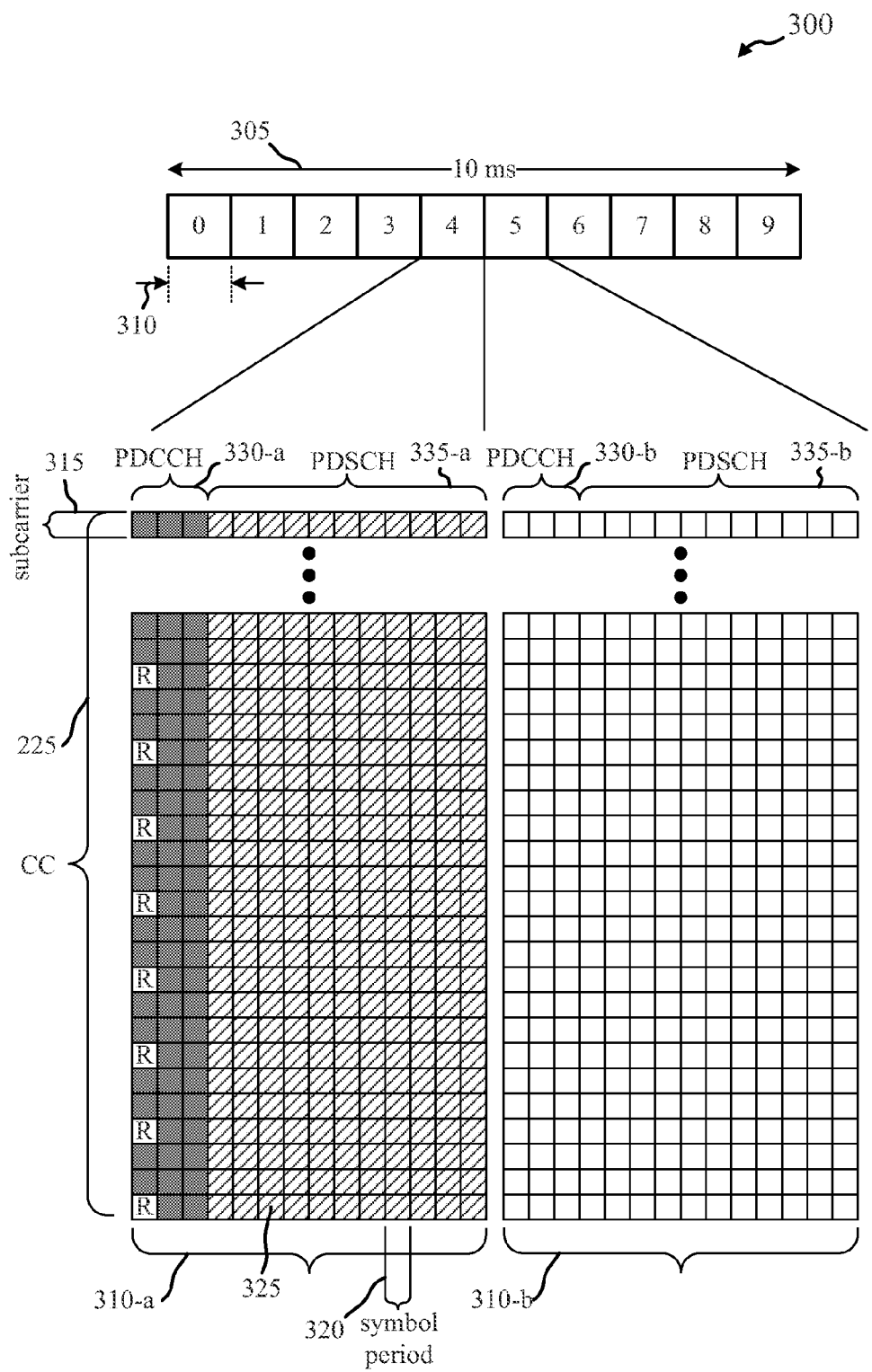
FIG. 3 shows a diagram of a conventional subframe and a dormant subframe in accordance with various embodiments.

FIG. 3 shows a diagram 300 of a radio frame 305 for an OFDMA downlink component carrier 225 in accordance with various embodiments. Component carrier 225 covers an amount of bandwidth available for a carrier which may be partitioned into multiple (K) orthogonal subcarriers 315, which are also commonly referred to as tones, bins, or the like. Each subcarrier 315 may be modulated with data. One subcarrier 315 over one symbol period 320 may be referred to as a resource element 325. The spacing between adjacent subcarriers 315 may be fixed, and the total number (K) of subcarriers 315 may be dependent on the system bandwidth. For example, K may be equal to 72, 180, 300, 600, 900, or 1200 with a subcarrier spacing of 15 kilohertz (KHz) for a corresponding system bandwidth (with guardband) of 1.4, 3, 5, 10, 15, or 20 megahertz (MHz), respectively. The system bandwidth may also be partitioned into sub-bands. For example, a sub-band may cover 1.08 MHz, and there may be 1, 2, 4, 8 or 16 sub-bands.

Radio frame 305 may have a radio frame length of 10 milliseconds (ms). Frame 305 may be divided into a number of subframes 310. For example, frame 305 may be divided into 10 subframes 310 as depicted in diagram 300, where each subframe may have a length of 1 ms. Each subframe 310 may be further subdivided into a number of symbol periods. Each symbol period may cover a length of time sufficient to transmit a single modulation symbol. A symbol period may also include a period of time reserved for a guard period or transmission of a cyclic prefix.

Resource elements 325 may be used for different purposes. For example, a set of resource elements may be reserved for the transmission of a downlink control channel. This set may be correspond to the physical downlink control channel (PDCCH) 330-a or 330-b. Another set of resource elements may correspond to a physical downlink shared channel (PDSCH) 335-a or 335-b. Some resource elements within the PDCCH 330 or PDSCH 335 may be used for the transmission of reference signals (e.g., cell-specific reference signals (CRS), channel state information reference signals (CSI-RS), positioning reference signals (PRS), multicast-broadcast single-frequency network (MBSFN) reference signals, UE-specific reference signals which may also be known as demodulation reference signals (DM-RS), etc.). Reference signals may be used for channel identification and channel quality estimation. PDSCH 335-a may be used to transmit user data to one or more UEs 115 with reference to FIGS. 1 and 2.

As illustrated in FIG. 3, a radio frame 305 for downlink component carrier 225 may include a conventional subframe 310-a and a dormant subframe 310-b. The component carrier 225 may correspond to the downlink carrier of the SCell associated with link 125-b with reference to FIG. 2. In one embodiment, a carrier may be dormant for one or more frames 305. In another embodiment, a carrier may be dormant for a number of subframes 310 within a frame 305.

In some embodiments, no modulation symbols are transmitted on PDCCH 330-b or PDSCH 335-b during dormant subframes. In some cases, some signals are sent, but the amount of signaling is reduced. A dormant cell may continue to transmit some reference signals or some control information, in some cases. For example, a dormant cell may transmit overhead (discovery) signal transmissions on a downlink carrier with low periodicity. For active cells, primary synchronization signals (PSS) and secondary synchronization signals (SSS) may be transmitted with a periodicity of M=5 ms, cell-specific reference signals (CRS) may be transmitted every active subframe, CSI-RS may be transmitted every K active subframes (e.g., every fifth active subframe, etc.), and positioning reference signals (PRS) may be transmitted as configured. For a dormant cell, PSS/SSS and CRS/CSI-RS/PRS may be transmitted in N ms bursts every M ms with L ms offset. The parameters N, M, and L may be defined in a discovery reference signal (DRS) configuration for the SCell and may be configured by a serving active cell (e.g., PCell, etc.).

In one example, values for these variables for a dormant cell may be N=1, M=80 ms, or 160 ms, and L=0. UEs may detect dormant cells using PSS/SSS and measure reference signal received power (RSRP) on CRS/CSI-RS/PRS. The system frame number (SFN) may be synchronized with neighboring active cells (e.g. PCell). In some cases, a subframe or SFN offset might also be configured. In one embodiment, active eNBs may not schedule data traffic on subframes where discovery signal is configured. UE radio resource management (RRM) measurements may be based on low periodicity CRS/CSI-RS/PRS. The UE 115 may determine how to combine or select CSI-RS, PRS, and CRS measurements.

Figure 4A:
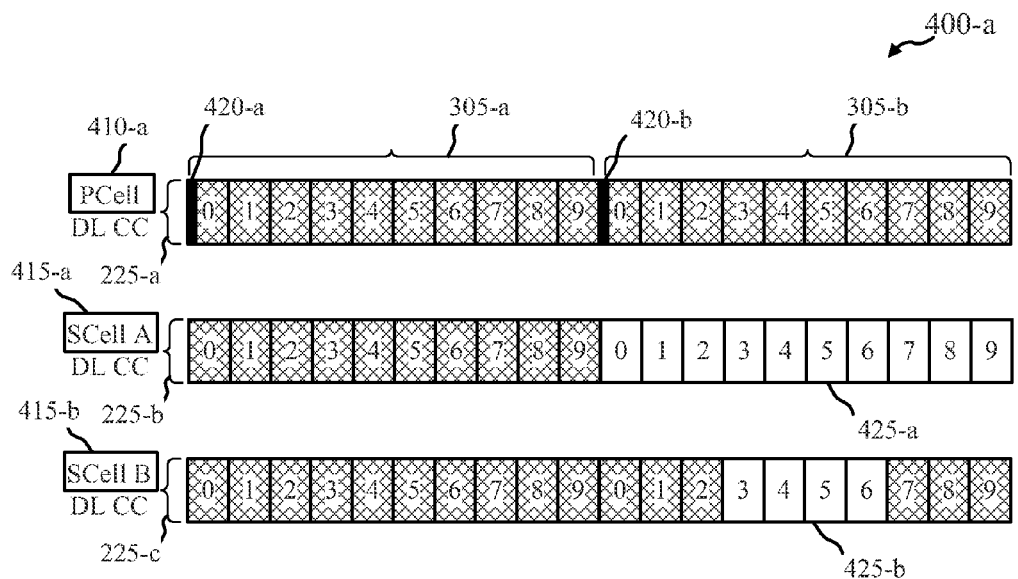
FIGS. 4A and 4B show diagrams of an indication that a number of subframes of the carriers are dormant in accordance with various embodiments.

FIG. 4A shows a diagram 400-a of indication of cell mode for one or more SCells using indicators sent over carriers of a PCell in accordance with various embodiments. Diagram 400-a illustrates downlink CC 225-a associated with a PCell 410-a, downlink CC 225-b associated with SCell A 415-a, and downlink CC 225-c associated with SCell B 415-b. In some examples, SCell A 415-a and SCell 415-b may be transmitted by the same eNB 105 as PCell 410-a, or one or more of these SCells 415 may be transmitted by different eNBs 105. The illustrated PCells 410 and SCells 415 may support the same UE, and each of the PCells 410 and SCells 415 may support more than one UE. SCells 415 may enter a dormant state in which they do not transmit user data on the associated downlink CC 225 and also reduce control signaling and reference signaling, as described above.

In embodiments, the PCell 410-a transmits periodic or aperiodic indicators of cell mode for one or more SCells 415. The cell mode indicator(s) may be transmitted in a unicast, multicast, or broadcast manner. For example, at the beginning of each frame (or other periodicities such as a number of frames such as 2, 4, 5, 8, 10, etc. frames), the PCell 410-a may transmit (e.g., broadcast, multicast, unicast, etc.) the mode indication regarding whether SCells 415-a, 415-b are active or dormant for the given time period, or a cell mode configuration of active subframes within the frame(s). For broadcast or multicast, the indication of cell mode for each SCell 415 may be transmitted on the downlink CC 225-*a* for the PCell 410-*a* in broadcast or unicast control signaling (e.g., in a common search space using broadcast or multicast DCI formats or broadcast or multicast radio network temporary identifiers (RNTIs, etc.) or in a message scheduled using broadcast or multicast control signaling. In one example, cell mode indicators are broadcast in a message scheduled using DCI format 1C in the common search space. For unicast, the indication of cell mode for each SCell 415 may be transmitted in unicast control signaling (e.g., in the common or UE-specific search spaces using unicast DCI formats or a unicast RNTI, etc.) or in a message scheduled via unicast control signaling. In some embodiments, the PCell 410-*a* transmits cell mode indicators for certain SCells (e.g., from the same eNB 105, etc.) regardless of whether the SCells are configured for self-scheduling or cross-carrier scheduling.

In diagram 400-*a*, the PCell 410-*a* transmits cell mode indicators 420-*a* and 420-*b* at the beginning of frames 305-*a* and 305-*b* that indicate cell mode for SCell A 415-*a* and SCell B 415-*b* during the respective frames. Cell mode indicator 420-*a* indicates that SCell A 415-*a* and SCell B 415-*b* are not dormant for frame 305-*a*, and thus transmit over the respective downlink CCs 225-*b* and 225-*c*. Cell mode indicator 420-*b* indicates that SCell A 415-*a* will be dormant for dormant period 425-*a* (e.g., frame 305-*b*) and that SCell B 415-*b* will be dormant for a dormant period 425-*b* (e.g., subframes 3-6 of frame 305-*b*).

In some embodiments, lack of reception of cell mode indication may be interpreted by UEs 115 as dormant mode. For example, cell mode indicator 420-*b* may omit an indication for SCell A 415-*a* and UEs may interpret the lack of indication of cell mode as dormancy of SCell A 415-*a* for frame 305-*b*. Alternatively, SCells 415 may default to active for frames for which no cell mode indication is received. For example, the PCell 410-*a* may not transmit cell mode indicator 420-*a* and UEs may interpret the lack of cell mode indication for SCells A and B for frame 305-*a* as a default to active state.

Additionally or alternatively, the PCell 410-*a* may transmit cell mode indicators aperiodically. Aperiodic indicators of cell mode may be effective until a further cell mode indicator is transmitted. For example, a cell mode indicator received at subframe n−k (e.g., where k is a number such as 1, 2, 3, 4, 5, 8, etc.) may be valid for subframe n and all other subsequent subframes until a further cell mode indicator is transmitted. Aperiodic cell mode indicators may be restricted to a subset of frames (e.g., every 2, 4, 5, 8, 10, etc. frames, frames configured for DRS, etc.) and/or a subset of subframes within frames (e.g., subframes 0 and 5 of each frame or selected frames, etc.). Restricted transmission timing for cell mode indicators may reduce the amount of blind decoding for control information used to transmit the cell mode indicators. Thus, PCell 410-*a* may transmit cell mode indicators for one or more SCells 415 according to any combination of timing schemes (e.g., aperiodic or periodic) and transmission schemes (e.g., unicast, multicast, or broadcast).

In some embodiments, UEs 115 decode cell mode indicators for activated SCells only. Alternatively, UEs 115 may decode cell mode indictors for deactivated but configured SCells only. In this case, the UEs may assume that activated SCells will transmit PSS/SSS and CRS/CSI-RS/PRS with the normal periodicities of an active cell. In yet another embodiment, an eNB 105 may not transmit mode information for SCells, and the UE 115 may determine the operating mode on a subframe by subframe basis (e.g., by detecting the presence or periodicities of the various synchronization or reference signals, etc.).

Figure 4B:
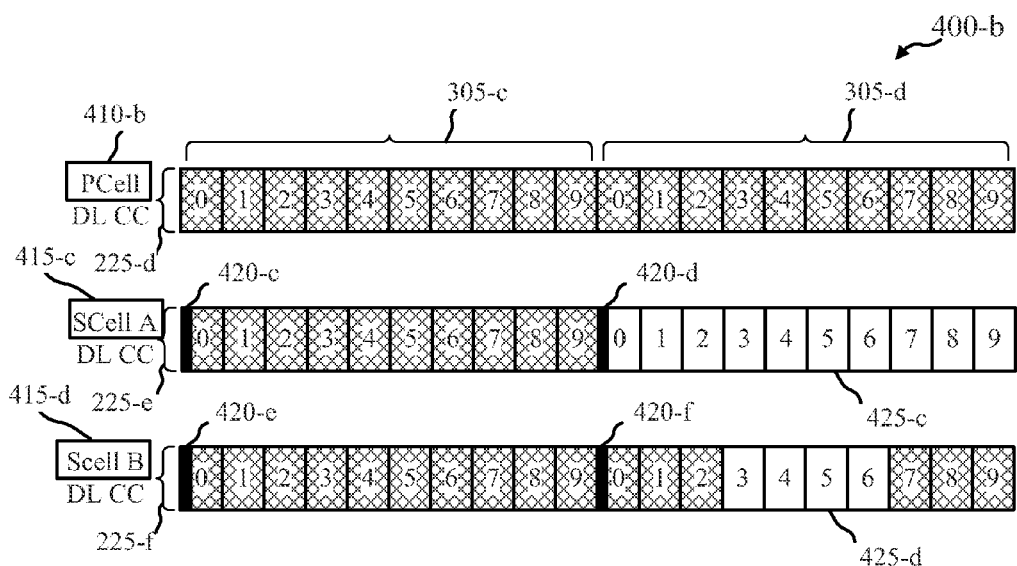

FIG. 4B shows a diagram 400-*b* of indication of cell mode for one or more SCells using indicators sent over carriers of SCells in accordance with various embodiments. Diagram 400-*b* illustrates downlink CC 225-*d* associated with a PCell 410-*b*, downlink CC 225-*e* associated with SCell A 415-*c*, and downlink CC 225-*f* associated with SCell B 415-*d*. In some examples, SCell A 415-*c* and SCell 415-*d* may be transmitted by the same eNB 105 as PCell 410-*b*, or one or more of these SCells 415 may be transmitted by different eNBs 105. The illustrated PCells and SCells may support the same UE, and each of the PCells and SCells may support more than one UE. SCells may enter a dormant state in which they do not transmit user data on the associated downlink CC 225 and also reduce control signaling and reference signaling, as described above.

In embodiments, SCells 415 transmit indicators of cell mode, such as periodically or aperiodically. For example, at the beginning of each frame (or other periodicities such as a number of frames), each SCell 415 may transmit (e.g., broadcast, multicast, unicast, etc.) a mode indication regarding whether the SCell 415 is active or dormant for the given time period, or a cell mode configuration of active subframes within the frame(s). The indication may be transmitted on the downlink CC 225 for the SCell 415 in unicast, broadcast, or multicast control signaling or in a message scheduled using unicast, broadcast, or multicast control signaling. In some embodiments, the SCell 415 transmits cell mode indicators, such as periodically or aperiodically, regardless of whether the SCell 415 is configured for self-scheduling or cross-carrier scheduling for UEs served by the SCell 415. For example, even when an SCell 415 is not configured for self-scheduling for any served UEs, the SCell 415 may transmit cell mode indicators, such as periodically or aperiodically, and the served UEs may monitor the downlink CC 225 of the SCell 415 for the cell mode indicators.

In diagram 400-*b*, SCell A 415-*c* transmits cell mode indicators 420-*c* and 420-*d* at the beginning of frames 305-*c* and 305-*d* on downlink CC 225-*e* that indicate the cell mode for SCell A 415-*c* during the respective frames. Cell mode indicator 420-*c* indicates that SCell A 415-*c* is not dormant for frame 305-*a*, while cell mode indicator 420-*d* indicates that SCell A 415-*c* is dormant for dormant period 425-*c* (e.g., frame 305-*d*). Similarly, SCell B 415-*d* transmits cell mode indicators 420-*e* and 420-*f* at the beginning of frames 305-*c* and 305-*d*. Cell mode indicator 420-*e* indicates that SCell B 415-*d* is not dormant for frame 305-*a*, while cell mode indicator 420-*f* indicates that SCell B 415-*d* is dormant for dormant period 425-*d* (e.g., subframes 3-6 of frame 305-*d*).

In some embodiments, lack of reception of eNB cell mode indication may be interpreted by UEs 115 as dormant mode. For example, SCell A 415-*c* may omit transmission of cell mode indicator 420-*d* on downlink CC 225-*e*, thus indicating that SCell A 415-*c* is dormant for frame 305-*d*. Alternatively, SCells may default to active for frames for which no cell mode indication is received. For example, SCell A 415-*c* may omit transmission of cell mode indicator 420-*c*, thus indicating that SCell A 415-*c* is not dormant for frame 305-*c*.

Additionally or alternatively, SCells may transmit cell mode indicators aperiodically. As described above, aperiodic indicators of cell mode may be effective until a further cell mode indicator is transmitted and may be restricted to certain frames or subframes within certain frames. Thus, SCells may transmit cell mode indicators according to any combination of timing schemes (e.g., aperiodic or periodic) and transmission schemes (e.g., unicast, multicast, or broadcast).

In some embodiments, UEs 115 decode cell mode indicators for activated SCells only. Additionally or alternatively, UEs 115 may decode cell mode indictors for deactivated but configured SCells. In yet another embodiment, an eNB 105 may not transmit mode information for SCells, and the UE 115 may determine the operating mode on a subframe by subframe basis (e.g., by detecting the presence or periodicities of the various synchronization or reference signals, etc.).

Figure 5A:
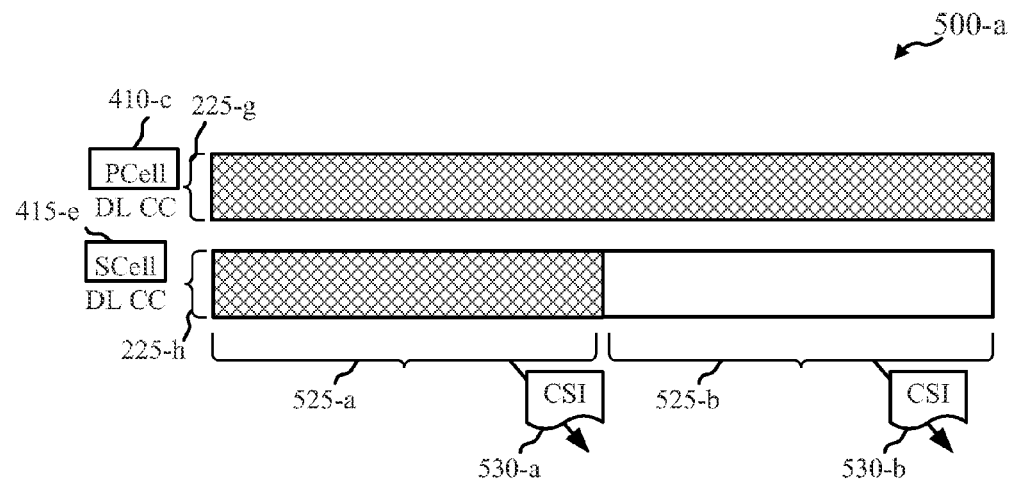
FIGS. 5A and 5B show diagrams of a CSI reporting configuration based on dormant subframes in accordance with various embodiments.

FIG. 5A shows a diagram 500-a of a CSI reporting configuration based on dormant subframes in accordance with various embodiments. Diagram 500-a illustrates downlink CC 225-g associated with a PCell 410-c and downlink CC 225-h associated with an SCell 415-e. SCell 415-e may be transmitted by the same eNB 105 as PCell 410-c, or by a different eNB 105, in some examples. The illustrated PCells and SCells may support the same UE, and each of the PCells and SCells may support more than one UE. SCells may enter a dormant state in which they do not transmit user data on the associated downlink CC 225 and also reduce control signaling and reference signaling, as described above.

In diagram 500-a, the SCell 415-e is active for a first time period 525-a (e.g., frames or subframes, etc.), and dormant for a second time period 525-b. A UE 115 configured for CA using PCell 410-c and SCell 415-e may send (e.g., on an uplink control channel, etc.) CSI report 530-a based on measurements of CSI resources (e.g., CRS, CSI-RS, etc.) or interference measurement resources (IMR) (e.g., CSI interference measurement (CSI-IM) resources, etc.) for downlink CC 225-h for time period 525-a. CSI report 530-a may include periodic or aperiodic CSI reports.

For time period 525-b where the SCell 415-e is dormant, the UE 115 may be configured to send CSI report 530-b. CSI report 530-b may be based on a CSI reporting configuration that is different than the CSI reporting configuration for time period 525-a. In some embodiments, CSI report 530-b is based on CSI measurements for downlink CC 225-h when the SCell 415-e was active. For example, the UE 115 may continue to report CSI during dormant period 525-b, but the CSI report 530-b may be based on the latest valid CSI resources. Thus, CSI report 530-b may include CSI based on channel or interference measurements from time period 525-a.

In some embodiments, the CSI reporting configuration for time period 525-b includes reporting some types of CSI while suppressing other types. In some cases, the UE 115 may suppress reporting for aperiodic CSI for dormant SCells while continuing to report periodic CSI. Alternatively, the UE 115 may suppress reporting for periodic CSI for dormant SCells while continuing to report aperiodic CSI based on aperiodic CSI triggers for dormant SCells.

In some embodiments, the CSI reporting configuration for time period 525-b is associated with a different configuration for measuring and reporting based on CSI-RS signals. For example, the CSI reporting configuration for time period 525-b may include measuring and reporting CSI based on different reference signals or a different measurement periodicity or offset than time period 525-a. For example, CSI-RS may be transmitted with the same or reduced periodicity during time period 525-b relative to time period 525-a, while CRS may be suppressed during time period 525-b. CSI report 530-b may include CSI generated from the transmitted CSI-RS. In some examples, CSI-RS may be transmitted during burst periods for time periods when the SCell 415-e is dormant. For example, CSI-RS may be transmitted every K' subframes with a subframe offset Δ' during a burst period of N subframes with a burst periodicity of M subframes and a burst offset of L subframes, where K' is the CSI-RS periodicity and Δ' is the subframe offset for cell dormancy periods and N, M, and L are configured according to the DRS configuration and may be defined in terms of frames or subframes. In some examples, K' and Δ' may be separately configured from the CSI-RS periodicity K and subframe offset Δ for non-dormancy periods, may be determined based on the burst period N (e.g., subframe offset Δ' may be the subframe offset Δ modulo the burst period N, etc.), or may be default values.

Additionally or alternatively, the CSI reporting configuration for time period 525-b includes measuring and reporting CSI based on different cells or a different antenna port configuration than time period 525-a. For example, CSI-RS may be transmitted by SCell 415-e during dormancy periods such as time period 525-b from a subset of antenna ports. In some examples, the UE 115 may report CSI for time period 525-b for a default subset of antenna ports or may report CSI for a default transmission mode. In some examples, the UE 115 may report CSI for at least one neighboring non-serving SCell 415 for time period 525-b (e.g., based on CSI-RS transmitted by the neighboring non-serving SCell 415 during time periods between DRS bursts from the serving SCell 415-e, etc.). The neighboring non-serving SCell 415 for reporting may be determined according to the physical cell index (PCI) of the neighboring cell (e.g., having the same PCI as the serving SCell 415-e, a PCI indicated via the PCell, etc.).

Additionally or alternatively, channel measurement and interference measurement may be handled differently for dormant period 525-b. For example, the UE 115 may report CSI based on measurements of IMR (e.g., CSI-IM, etc.) for time period 525-b, but may report CQI based on the latest time period that the SCell 415-e was active (e.g., time period 525-a). In other examples, the UE 115 may report CSI based on measurements of IMR (e.g., CSI-IM, etc.) for time period 525-b, but may suppress CQI reporting for time period 525-b. In some cases, the UE 115 may send a "null" CSI report 530-b indicating that it did not receive a reference signal from the SCell 415-e during dormant period 525-b.

In some examples, the UE 115 may perform averaging for CSI reporting. For time periods where averaging is performed that include dormant and non-dormant sub-periods, the UE 115 may perform averaging in a variety of ways. For example, the UE may perform averaging for channel measurements (e.g., CQI) only on subframes where the SCell was active and may consider subframes where the SCell was dormant to be invalid for channel measurement. The UE 115 may perform averaging for interference (e.g., IMR) on any subframes including dormant subframes. If enhanced Inter-Cell Interference Cancellation (eICIC) is employed for the SCell, averaging for interference may be restricted to subframe subsets (e.g., where eICIC is not employed in the downlink, etc.).

Figure 5B:
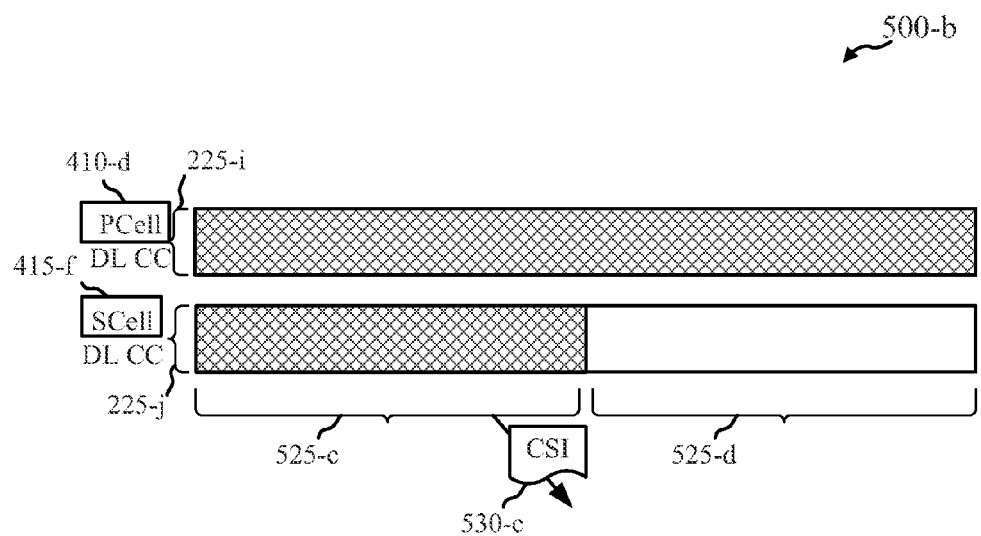

FIG. 5B shows a diagram 500-b of a CSI reporting configuration based on dormant subframes in accordance with various embodiments. Diagram 500-b illustrates downlink CC 225-associated with a PCell 410-d and downlink CC 225-j associated with an SCell 415-f. SCell 415-f may be transmitted by the same eNB 105 as PCell 410-d, or by a different eNB 105, in some examples. The illustrated PCells and SCells may support the same UE, and each of the PCells and SCells may support more than one UE. SCells may enter a dormant state in which they do not transmit user data on the associated downlink CC 225 and also reduce control signaling and reference signaling, as described above.

In diagram 500-b, the SCell is active for a first time period 525-c (e.g., frames or subframes, etc.), and dormant for a second time period 525-d. A UE 115 configured for CA using PCell 410-d and SCell 415-f may send (e.g., on an uplink control channel, etc.) CSI report 530-c based on measurements of CSI resources or IMR for multiple carriers including downlink CC 225-j for time period 525-c. CSI report 530-c may include periodic or aperiodic CSI reports. Where a reference resource (e.g., for an aperiodic or periodic CSI report, etc.) occurs during a time period where the SCell 415-f is dormant, the UE 115 may suppress reporting for the SCell 415-f. For example, if a reference resource for periodic or aperiodic CSI reporting occurs in time period 525-d where the SCell 415-f is dormant, the UE 115 may be configured to suppress CSI reporting. For example, the UE 115 may be allowed to skip reporting CSI feedback if the reference CSI feedback subframe (e.g., CQI measurement subframe, IMR subframe, etc.) occurs when the SCell was operating in dormant mode.

Figure 6:
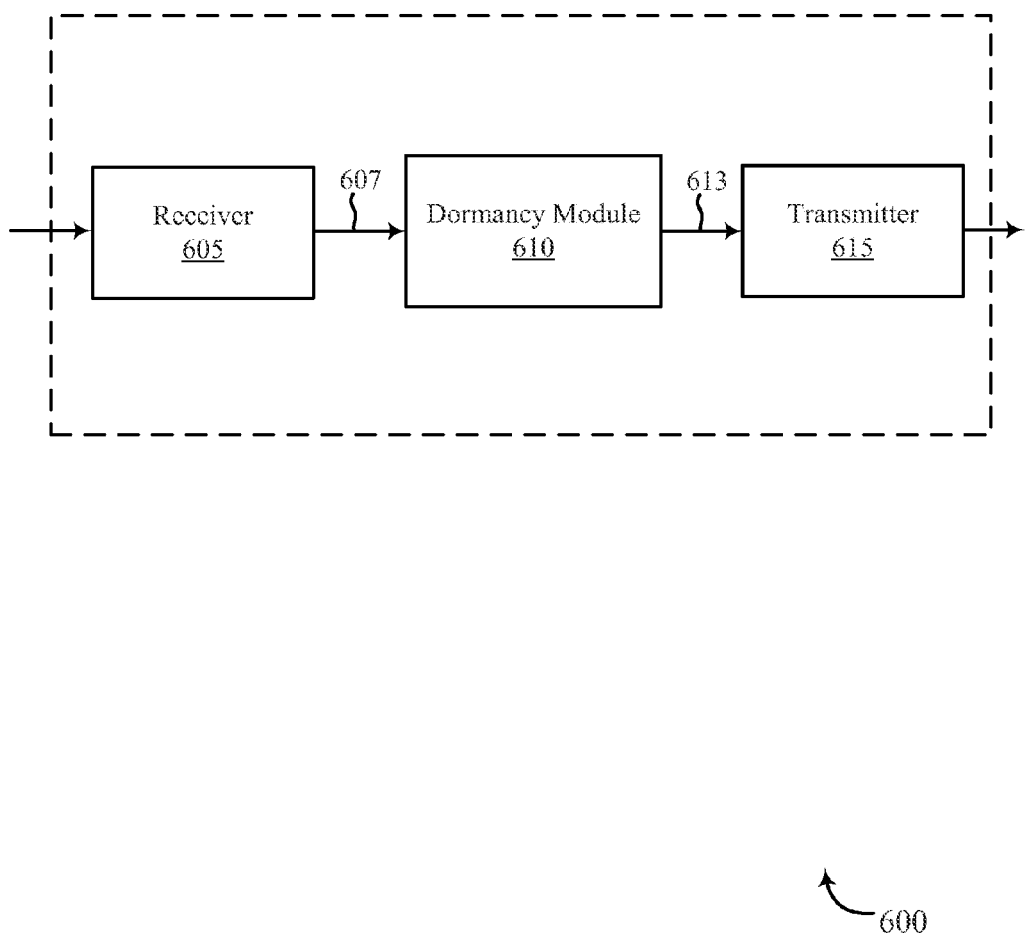
FIG. 6 shows a device for reducing the overhead signaling for dormant carriers in a wireless communication system in accordance with various embodiments.

FIG. 6 shows a device 600 for dynamic cell mode indication and reporting channel and interference feedback for dormant cells in a carrier aggregation environment in accordance with various embodiments. The device 600 may be an example of one or more aspects of a UE 115 described with reference to FIGS. 1 and 2. The device 600 may include a receiver 605, a dormancy module 610, and a transmitter 615. The device 600 may also include a processor (not shown). Each of these components may be in communication with each other.

The receiver 605 may receive information such as packets, user data, or control information associated with various information channels (e.g., control channels, data channels, etc.). The receiver 605 may receive the various information channels over a primary carrier associated with a primary cell and one or more secondary carriers associated with secondary cells. Information 607 may be passed on to the dormancy module 610, and to other components of the device 600.

The dormancy module 610 may be means for monitoring a carrier from among a primary carrier and one or more secondary carriers for an indication that at least one secondary carrier is dormant. It may also be means for determining, based on the indication, whether the at least one secondary carrier is dormant for a predetermined time period.

The transmitter 615 may transmit signals 613 received from other components of the device 600. Signals 613 may include, for example, feedback information (e.g., CSI, etc.) for the one or more secondary carriers. The transmitter 615 may transmit information over a primary carrier associated with a primary cell and one or more secondary carriers associated with secondary cells. In some embodiments, the transmitter 615 may be collocated with the receiver 605 in a transceiver module. The transmitter 615 may include a single antenna, or it may include a plurality of antennas.

Figure 7:
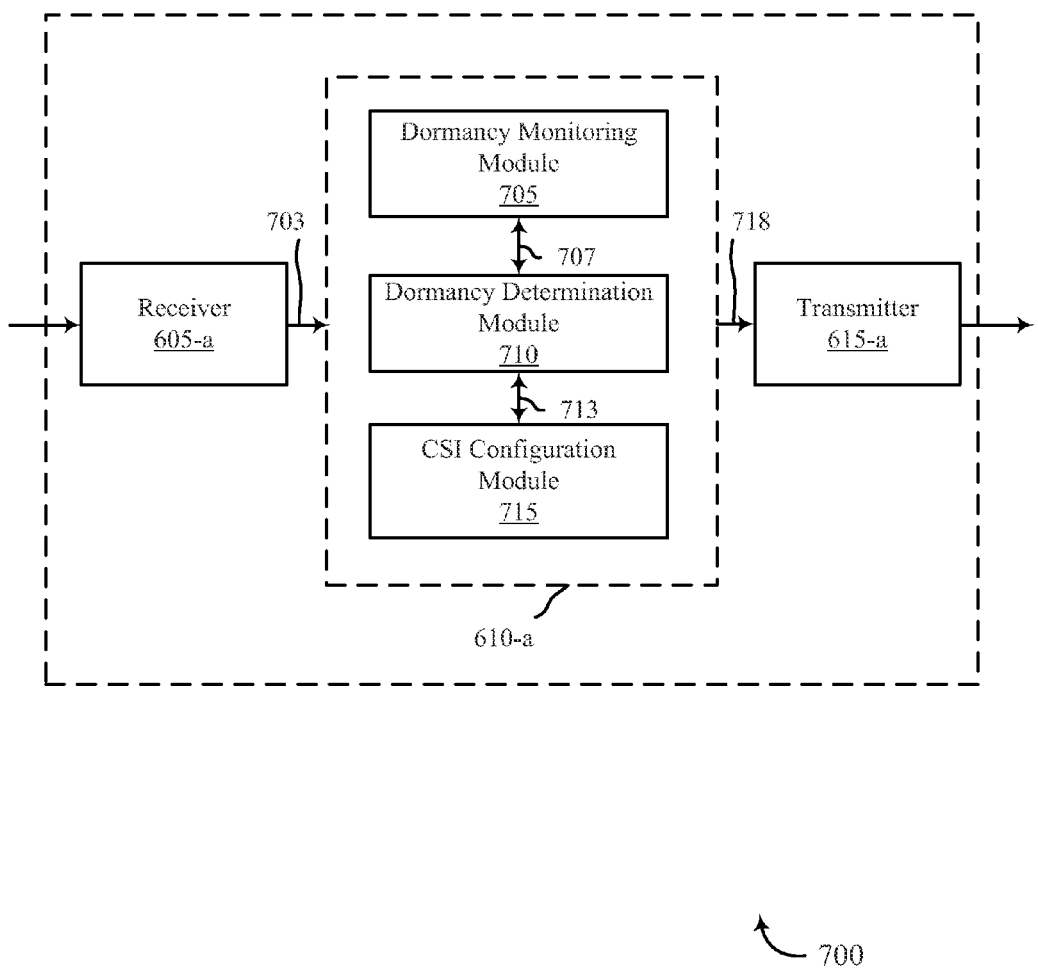
FIG. 7 shows a device for reducing the overhead signaling for dormant carriers in a wireless communication system in accordance with various embodiments.

FIG. 7 shows a device 700 for dynamic cell mode indication and reporting channel and interference feedback for dormant cells in a carrier aggregation environment in accordance with various embodiments. The device 700 may be an example of one or more aspects of a UE 115 described with reference to FIGS. 1 and 2. It may also be an example of a device 600 described with reference to FIG. 6. The device 700 may include a receiver 605-a, a dormancy module 610-a, and a transmitter 615-a, which may be examples of the corresponding components of device 600. The device 700 may also include a processor (not shown). Each of these components may be in communication with each other. For example, the receiver 605-a may pass information 703 to the dormancy module 610-a which may pass one or more signals 718 to the transmitter 615-a. The dormancy module 610-a may include a dormancy monitoring module 705, a dormancy determination module 710 and a channel state information (CSI) configuration module 715. The receiver 605-a and the transmitter 615-a may perform the functions of the receiver 605 and the transmitter 615, of FIG. 6, respectively.

The dormancy monitoring module 705 may be means for monitoring a carrier from among a primary carrier and one or more secondary carriers for an indication that at least one secondary carrier is dormant. In embodiments, it may be means for monitoring a search space (e.g., common search space, UE-specific search space, etc.) of the carrier at a predefined time interval for broadcast, multicast, or unicast downlink control information (DCI) that includes or schedules a message including the indication. The dormancy monitoring module 705 may pass an indication 707 of cell dormancy to the dormancy determination module 710.

The dormancy determination module 710 may be means for determining, based on the indication 707 passed from the dormancy monitoring module 705, whether the at least one secondary carrier is dormant (e.g., aperiodically, for a predetermined time period, etc.). In one embodiment, it may be means for determining, based on a presence of the indication, that the at least one secondary carrier is dormant for a predetermined time period. In another embodiment, means for determining, based on an absence of the indication, that the at least one secondary carrier is dormant for a predetermined time period. The dormancy determination module 710 may pass a dormancy determination 713 for the at least one secondary carrier to the CSI configuration module 715.

The CSI configuration module 715 may be means for determining a channel state information (CSI) reporting configuration for the at least one secondary carrier. The CSI configuration module 715 may receive the dormancy determination 713 and may determine the CSI reporting configuration based at least in part on the dormancy determination 713. In one embodiment, it may be means for suppressing CSI reporting for the at least one secondary carrier for one or more of periodic CSI reporting or aperiodic CSI reporting. In one embodiment, it may be means for reporting CSI based on channel measurements of the at least one secondary carrier during at least one time period when the at least one secondary carrier was non-dormant. In some cases, the CSI reporting configuration comprises averaging the channel measurements from the at least one time period. In some cases, the configuration may comprise reporting CSI based on measurements for the at least one secondary carrier during a dormant time period of the at least one secondary carrier.

In some examples, the CSI reporting configuration determined by the CSI configuration module 715 may include a CSI-RS measurement configuration for a time period that the secondary carrier is dormant. For example, the CSI-RS measurement configuration may include reduced periodicity for CSI-RS signals, CSI-RS transmission based on a DRS configuration, measurement of CSI-RS signals for a reduced subset of antenna ports, or measurement of CSI-RS signals for a different secondary carrier, as described above.

Figure 8:
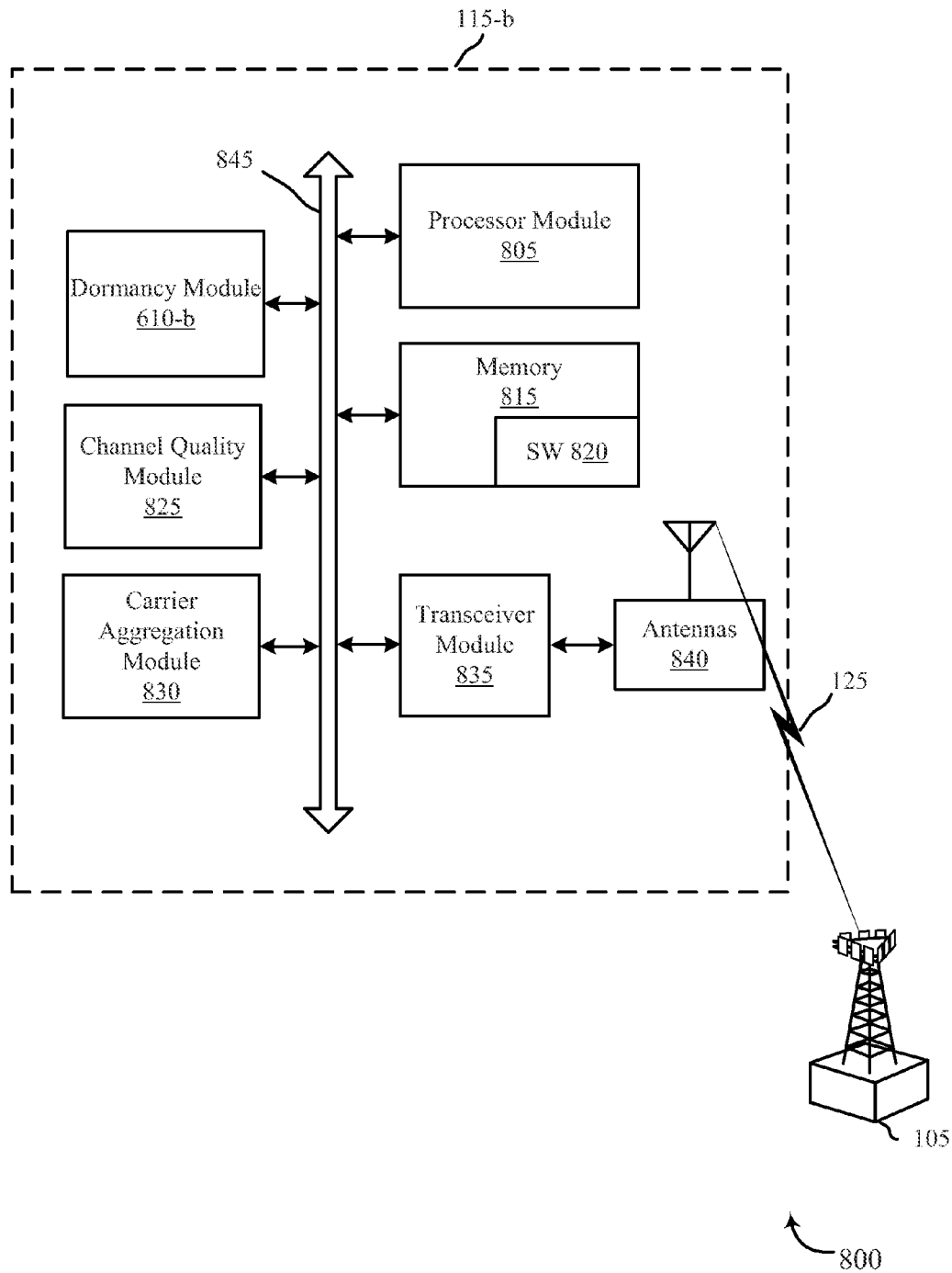
FIG. 8 shows a device for reducing the overhead signaling for dormant carriers in a wireless communication system in accordance with various embodiments.

FIG. 8 shows a system 800 for dynamic cell mode indication and reporting channel and interference feedback for dormant cells in a carrier aggregation environment in accordance with various embodiments. System 800 may include a UE 115-*b*, which may be an example of the UEs 115 of FIGS. 1 and 2, or devices 600 and 700 of FIGS. 6-7.

The UE 115-*b* may generally include components for bi-directional voice and data communications including components for transmitting communications and components for receiving communications. The UE 115-*b* may include antenna(s) 840, a transceiver module 835, a processor module 805, and memory 815 (including software (SW) 820), which each may communicate, directly or indirectly, with each other (e.g., via one or more buses 845). The transceiver module 835 may be configured to communicate bi-directionally, via the antenna(s) 840 or one or more wired or wireless links, with one or more networks, as described above. For example, the transceiver module 835 may be configured to communicate bi-directionally with base stations 105 with reference to FIG. 1. The transceiver module 835 may include a modem configured to modulate the packets and provide the modulated packets to the antenna(s) 840 for transmission, and to demodulate packets received from the antenna(s) 840. While the UE 115-*b* may include a single antenna 840, the UE 115-*b* may have multiple antennas 840 capable of concurrently transmitting or receiving multiple wireless transmissions. The transceiver module 835 may be capable of concurrently communicating with one or more base stations 105 via multiple component carriers.

The UE 115-*b* may include a dormancy module 610-*b*, which may perform the functions described by the dormancy modules 610 of devices 600 and 700 of FIGS. 6 and 7. The UE 115-*b* may also include a channel quality module 825 and a carrier aggregation module 830. The channel quality module 825 may perform channel measurements and interference measurements for configured carriers. For example, the channel quality module 825 may perform measurements of carriers of SCells for CSI reporting as described above with reference to FIGS. 5A and 5B. The carrier aggregation module 830 may perform functions associated with configuring UE 115-*b* for carrier aggregation. For example, the carrier aggregation module 830 may process messaging (e.g., DCI, RRC, MAC, etc.) for configuring one or more SCells for the UE 115-*b* including configuring scheduling and activation/deactivation of the one or more SCells.

The memory 815 may include random access memory (RAM) and read-only memory (ROM). The memory 815 may store computer-readable, computer-executable software/firmware code 820 containing instructions that are configured to, when executed, cause the processor module 805 to perform various functions described herein (e.g., call processing, database management, processing of carrier mode indicators, reporting CSI for dormant SCells according to a CSI configuration, etc.). Alternatively, the software/firmware code 820 may not be directly executable by the processor module 805 but be configured to cause a computer (e.g., when compiled and executed) to perform functions described herein. The processor module 805 may include an intelligent hardware device, e.g., a central processing unit (CPU), a microcontroller, an application-specific integrated circuit (ASIC), etc.

Figure 9:
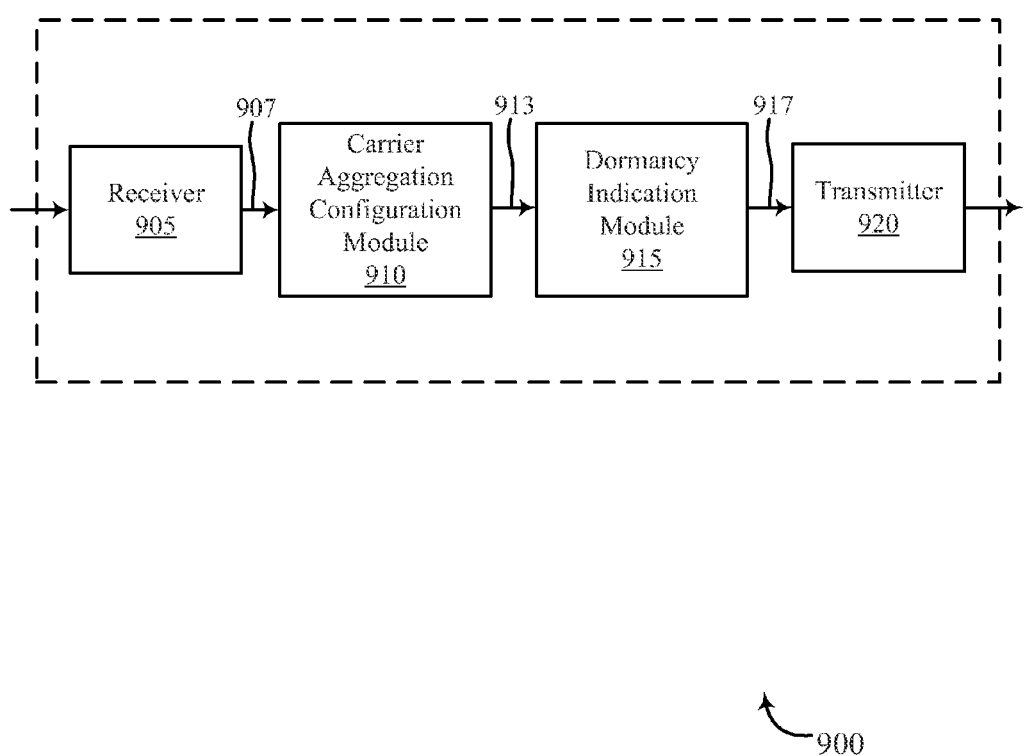
FIG. 9 shows a device for reducing the overhead signaling for dormant carriers in a wireless communication system in accordance with various embodiments.

FIG. 9 shows a device 900 for dynamic cell mode indication and reporting channel and interference feedback for dormant cells in a carrier aggregation environment in accordance with various embodiments. The device 900 may be an example of one or more aspects of an eNB 105 described with reference to FIGS. 1 and 2. The device 900 may include a receiver 905, a carrier aggregation configuration module 910, a dormancy indication module 915 and a transmitter 920. The device 900 may also include a processor (not shown). Each of these components may be in communication with each other.

The receiver 905 may receive information such as packets, user data, or control information associated with various information channels (e.g., control channels, data channels, etc.). The receiver 905 may receive the various information channels over one or more carriers. The received information 907 may be passed on to the carrier aggregation configuration module 910, and to other components of the device 900.

The carrier aggregation configuration module 910 may be means for establishing, at a base station 105, a configuration for communication with one or more UEs 115 using a plurality of carriers including a primary carrier (e.g., PCell) and one or more secondary carriers (e.g., SCells). The carrier aggregation configuration module 910 may perform functions associated with configuring carriers (e.g., PCells and SCells) and UEs 115 for carrier aggregation. For example, the carrier aggregation configuration module 910 may process messaging (e.g., DCI, RRC, MAC, etc.) for configuring the one or more UEs for carrier aggregation using one or more SCells including configuring scheduling and activation/deactivation of the one or more SCells. The carrier aggregation configuration module 910 may determine time periods when an SCell is dormant based on, for example, scheduling information for the one or more UEs. In some cases, the carrier aggregation configuration module 910 may adjust a schedule for transmitting reference signals (e.g., CRS, CSI-RS, PRS, etc.), such as to a UE 115. Adjusting the schedule for transmitting reference signals may be based on a secondary carrier being dormant. In some cases, the carrier aggregation configuration module 910 may reduce a frequency (i.e., temporal frequency) of reference signal transmission.

The dormancy indication module 915 may be means for indicating to the one or more UEs that at least one secondary carrier from the one or more secondary carriers is dormant, such as based on one or more signals 913 received from the carrier aggregation configuration module 910. In one embodiment, it may be means for transmitting (e.g., broadcast, multicast, unicast, etc.) control signaling including the indication (or scheduling a message including the indication) in a search space associated with the secondary carrier. In some cases, the control signaling may be transmitted according to DCI Format 1C. In one embodiment, the dormancy indication module 915 may be means for omitting transmission of an indication that the at least one secondary carrier from the one or more secondary carriers is non-dormant for a predetermined time period.

The transmitter 920 may transmit the one or more signals 917 received from other components of the device 900. In some embodiments, the transmitter 920 may be collocated with the receiver 905 in a transceiver module. The transmitter 920 may include a single antenna, or it may include a plurality of antennas. The transmitter 920, in coordination with the dormancy indication module 915, may be means for transmitting (e.g., broadcast, multicast, unicast, etc.) an indication that the at least one secondary carrier from the one or more secondary carriers is dormant. The indication may be transmitted periodically, or aperiodically, in some cases. In some embodiments, it may means for transmitting the indication by a carrier different from the secondary carrier. For example, a PCell may transmit on a primary carrier that an SCell is dormant. In other cases, it may be means for transmitting the indication for an SCell on a secondary carrier associated with the SCell.

Figure 10:
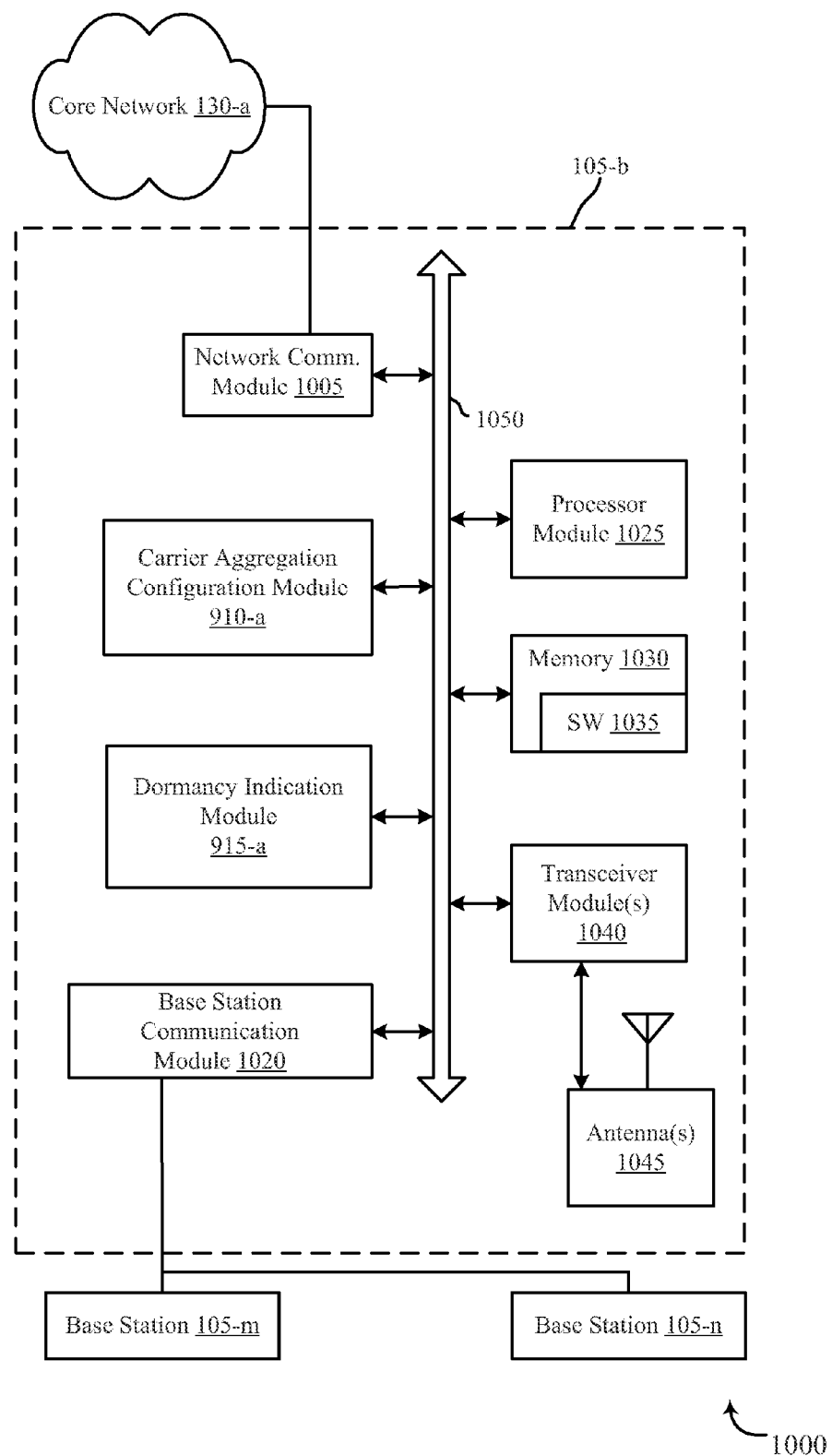
FIG. 10 shows a device for reducing the overhead signaling for dormant carriers in a wireless communication system in accordance with various embodiments.

FIG. 10 shows a communications system 1000 that may be configured for dynamic cell mode indication and reporting channel and interference feedback for dormant cells in a carrier aggregation environment in accordance with various embodiments. System 1000 may be an example of aspects of the systems 100 or 200 of FIG. 1 and FIG. 2. System 1000 includes eNB 105-*b*, which may incorporate the functionality and components of device 900, of FIG. 9.

In some cases, the eNB 105-*b* may have one or more wired backhaul links. The eNB 105-*b* may have a wired backhaul link (e.g., S1 interface, etc.) to the core network 130-*a*. The eNB 105-*b* may also communicate with other base stations 105, such as base station 105-*m* and base station 105-*n* via inter-base station communication links (e.g., X2 interface, etc.). Each of the base stations 105 may communicate with UEs 115 using the same or different wireless communications technologies. In some cases, eNB 105-*b* may communicate with other base stations such as 105-*m* or 105-*n* utilizing base station communication module 1020. In some embodiments, base station communication module 1020 may provide an X2 interface within an LTE/LTE-A wireless communication network technology to provide communication between some of the base stations 105. In some embodiments, eNB 105-*b* may communicate with other base stations through core network 130-*a*. In some cases, eNB 105-*b* may communicate with the core network 130-*a* through network communications module 1005.

The components for eNB 105-*b* may be configured to implement aspects discussed above with respect to eNB 105 of FIG. 1 and FIG. 2 or device 900 of FIG. 9, and some aspects may not be repeated here for the sake of brevity. For example, the eNB 105-*b* may be configured to indicate to UEs 115 served by secondary cells whether one or more of the secondary cells are dormant. It may include a carrier aggregation configuration module 910-*a* and a dormancy indication module 915-*a* that may examples of the carrier aggregation configuration module 910 and dormancy indication module 915 of device 900, respectively.

The eNB 105-*b* may include a processor module 1025, memory 1030 (including software (SW) 1035), transceiver modules 1040, and antenna(s) 1045, which each may be in communication, directly or indirectly, with each other (e.g., over bus system 1050). The transceiver modules 1040 may be configured to communicate bi-directionally, via the antenna(s) 1045, with the UEs 115, which may be multimode devices. The transceiver module 1040 (or other components of the eNB 105-*b*) may also be configured to communicate bi-directionally, via the antennas 1045, with one or more other base stations (not shown). The transceiver module 1040 may include a modem configured to modulate the packets and provide the modulated packets to the antennas 1045 for transmission, and to demodulate packets received from the antennas 1045. The eNB 105-*b* may include multiple transceiver modules 1040, each with one or more associated antennas 1045. The transceiver module may be an example of a combined receiver 905 and transmitter 920 of FIG. 9.

The memory 1030 may include random access memory (RAM) and read-only memory (ROM). The memory 1030 may also store computer-readable, computer-executable software code 1035 containing instructions that are configured to, when executed, cause the processor module 1025 to perform various functions described herein (e.g., selecting coverage enhancement techniques, call processing, database management, message routing, etc.). Alternatively, the software 1035 may not be directly executable by the processor module 1025 but be configured to cause the computer, e.g., when compiled and executed, to perform functions described herein.

The processor module 1025 may include an intelligent hardware device, e.g., a central processing unit (CPU), a microcontroller, an application-specific integrated circuit (ASIC), etc. The processor module 1025 may include various special purpose processors such as encoders, queue processing modules, base band processors, radio head controllers, digital signal processors (DSPs), and the like.

According to the architecture of FIG. 10, the eNB 105-*b* may further include a base station communication module 1020. The base station communication module 1020 may manage communications with other base stations 105. The communications management module may include a controller or scheduler for controlling communications with UEs 115 in cooperation with other base stations 105. For example, the base station communication module 1020 may perform scheduling for transmissions to UEs 115 or various interference mitigation techniques such as beamforming or joint transmission.

Figure 11A:
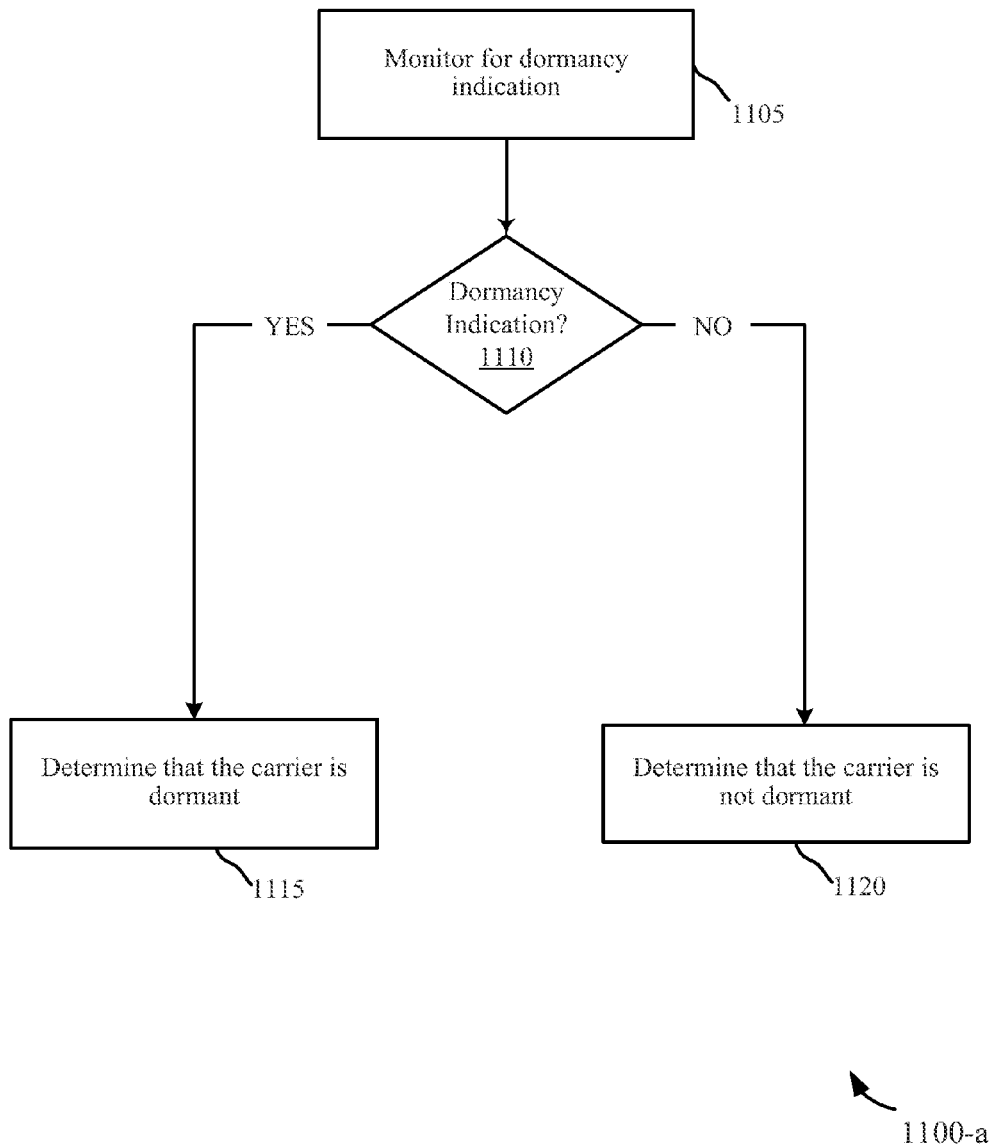
FIG. 11A shows a flowchart illustrating a method for reducing the overhead signaling for dormant carriers in a wireless communication system at a UE in accordance with various embodiments.

FIG. 11A is a flowchart 1100-*a* illustrating a method for dynamic cell mode indication in a carrier aggregation environment in accordance with various embodiments. The steps herein may be accomplished by a UE 115 of FIGS. 1, 2, and 8, or devices 600 or 700 of FIGS. 6-7.

At block 1105, a UE may monitor for a dormancy indication. In one embodiment, this may include monitoring a carrier from among a primary carrier and one or more secondary carriers for an indication (e.g., a periodic indication, an aperiodic indication, etc.) that at least one secondary carrier is dormant. In some cases, a predetermined time period corresponding to the indication may comprise one or more radio frames. It may also comprise one or more radio subframes. In one embodiment, the monitoring may be accomplished by the dormancy monitoring module 705.

In some cases, the monitoring the carrier may comprise monitoring a search space of the carrier at a predefined time interval for broadcast, multicast, or unicast control signaling including or scheduling a message including the indication. In some cases, the carrier comprises the carrier monitored for the indication. In other cases, the primary carrier and the carrier monitored for the indication comprise different carriers. In one embodiment, monitoring for the indication is based on an activation state of the at least one secondary carrier.

At block 1110, the UE may determine whether an indication has been received. In one embodiment the dormancy determination module 710 may determine, based on the indication, whether the at least one secondary carrier is dormant for a predetermined time period (e.g., 1, 2, 4, 5, 8, 10, etc. frames) or for selected subframes during the predetermined time period).

If a dormancy indication for the at least one secondary carrier is received at block 1110, the UE may determine that the at least one secondary carrier is dormant for the predetermined time period at block 1115. In one embodiment, the determination of dormancy for the at least one secondary carrier is determined at block 1115 by the presence of a transmitted dormancy indicator at block 1110.

If an indication is received at block 1110 that indicates that the at least one secondary carrier is not dormant for the predetermined time period, the UE may determine that the at least one secondary carrier is not dormant for the predetermined time period at block 1120. In some cases, the lack of a dormancy indication at block 1110 may indicate that the at least one secondary carrier is not dormant for the predetermined time period at block 1120.

Figure 11B:
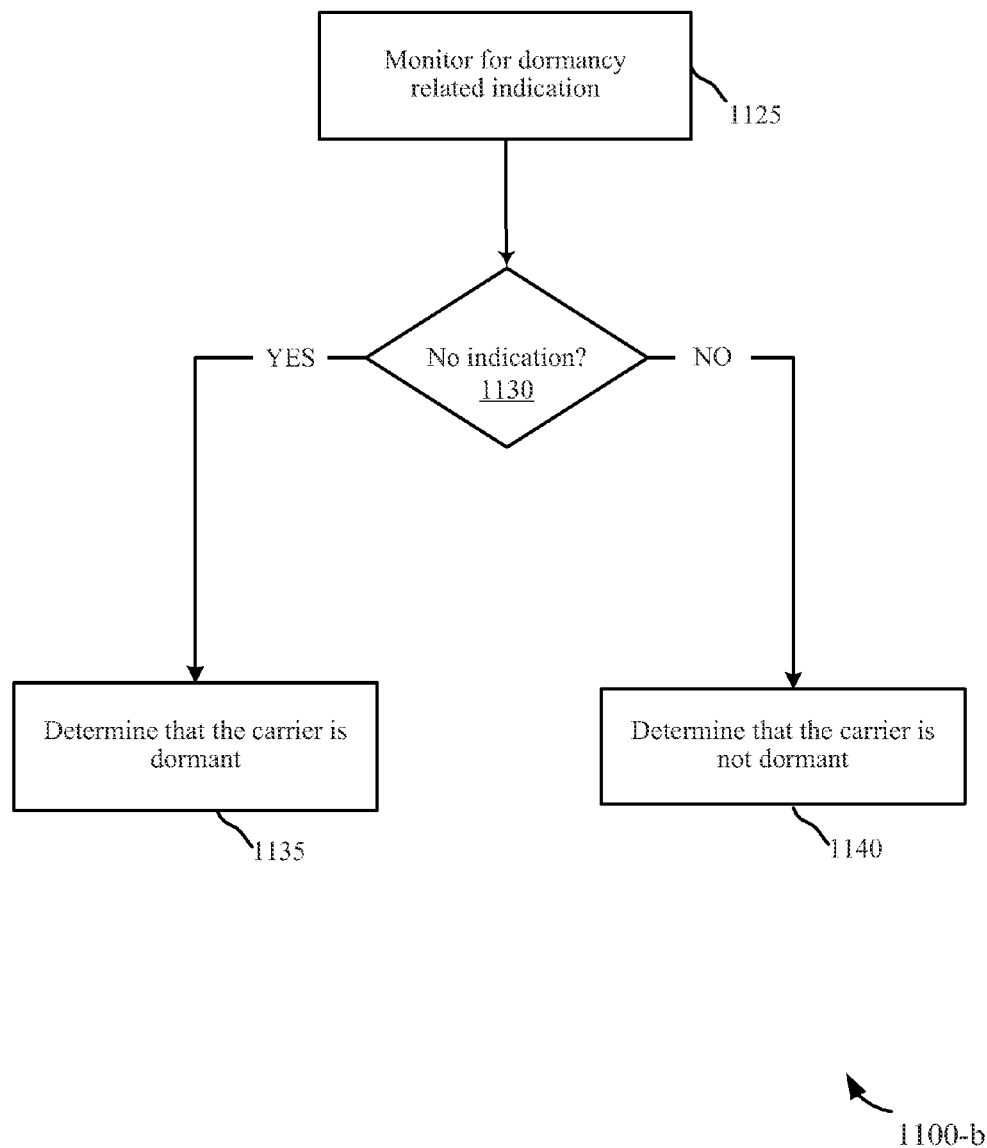
FIG. 11B shows a flowchart illustrating a method for reducing the overhead signaling for dormant carriers in a wireless communication system at a UE in accordance with various embodiments.

FIG. 11B is a flowchart 1100-b illustrating a method for dynamic cell mode indication in a carrier aggregation environment in accordance with various embodiments. The steps herein may be accomplished by a UE 115 of FIGS. 1, 2, and 8, or devices 600 or 700 of FIGS. 6-7.

At block 1125, a UE may monitor for an indication related to cell dormancy for one or more secondary carriers. In one embodiment, this may include monitoring a carrier from among a primary carrier and one or more secondary carriers for an indication (e.g., a periodic indication, an aperiodic indication, etc.) that one or more secondary carriers are dormant. In some cases, a predetermined time period corresponding to the indication may comprise one or more radio frames. It may also comprise one or more radio subframes. In one embodiment, the monitoring may be accomplished by the dormancy monitoring module 705. In one embodiment, monitoring for the indication is based on an activation state of the one or more secondary carriers.

At block 1130, the UE may determine that an absence of a dormancy related indication may be interpreted as an indication of dormancy. For example, the UE may consider that the absence of control signaling related to dormancy for a secondary carrier of the one or more secondary carriers means that the carrier will be dormant for the predetermined time period.

At block 1135, if an absence of an indication is detected for at least one secondary carrier of the one or more secondary carriers, the UE may determine that the at least one secondary carrier is dormant for the predetermined time period.

If an indication related to dormancy is received at block 1130 for at least one secondary carrier of the one or more secondary carriers, the UE may determine that the at least one secondary carrier is not dormant for the predetermined time period. In some cases, the indication related to dormancy may include information for sub-periods of the predetermined time period. For example, the indication may indicate subframes within a radio frame for which the at least one secondary carrier is active. The UE may determine that the at least one secondary carrier is dormant for the other subframes.

Figure 12:
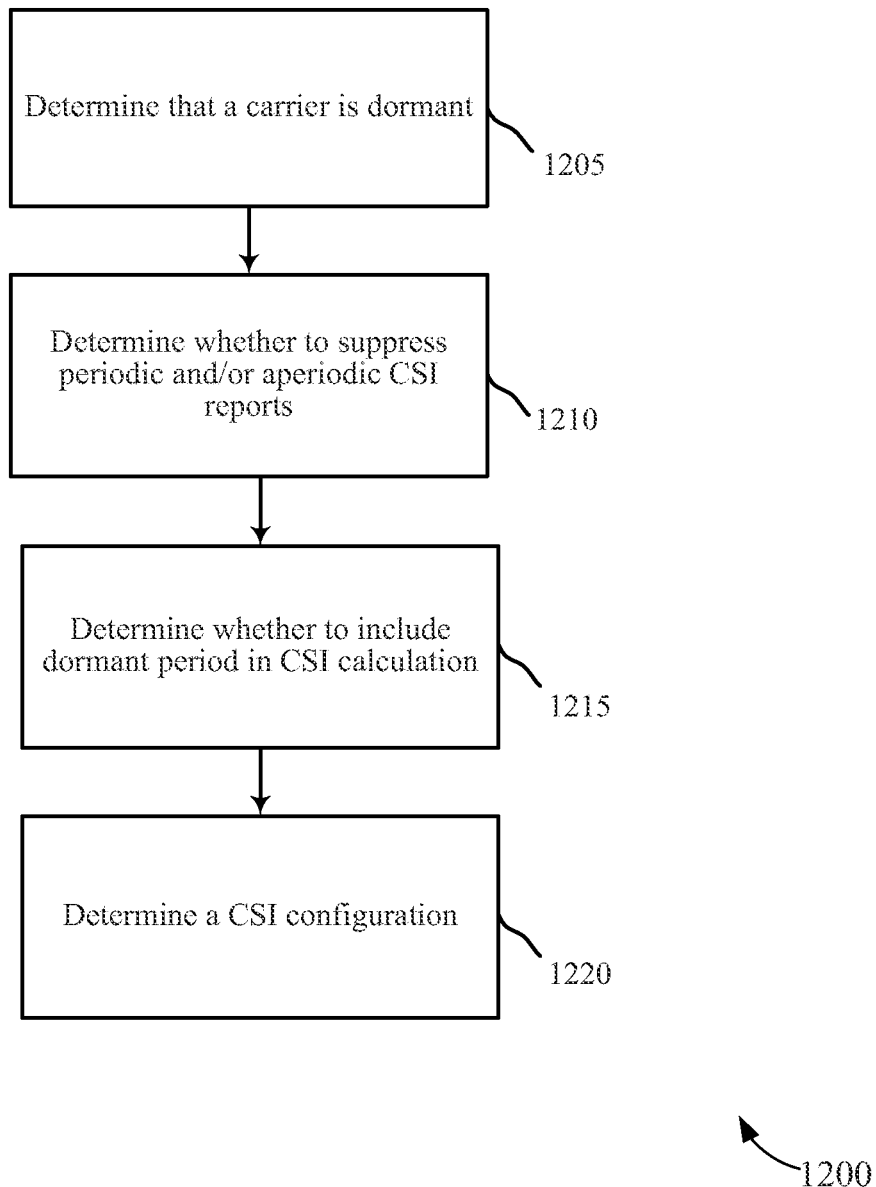
FIG. 12 shows a flowchart illustrating a method for configuring a CSI report in accordance with various embodiments.

FIG. 12 is a flowchart 1200 illustrating a method for reporting channel and interference feedback for dormant cells in a carrier aggregation environment in accordance with various embodiments. The steps herein may be accomplished by a UE 115 of FIGS. 1, 2, and 8, or devices 600 and 700 of FIGS. 6-7.

At block 1205, the UE 115 may determine that at least one secondary carrier is dormant. The UE 115 may determine that the at least one secondary carrier is dormant, for example, based on an indication of cell dormancy or based on inferring cell dormancy from signals in a carrier transmitted by the secondary cell.

At block 1210, the UE 115 may determine whether to suppress periodic and/or aperiodic CSI reports. In one embodiment, the UE 115 may suppress CSI reporting for the at least one secondary carrier for one or more of periodic CSI reporting or aperiodic CSI reporting, or a combination thereof.

At block 1215, the UE 115 may determine whether to include a dormant period in a CSI calculation. In some embodiments, the UE 115 may determine a CSI reporting configuration comprising reporting CSI based on channel measurements of the at least one secondary carrier during at least one time period when the at least one secondary carrier was non-dormant. In some embodiments, the UE may report interference measurements (e.g., IMR, etc.) based on measurements for the dormant period.

At block 1220, the UE 115 may determine a CSI reporting configuration. In one embodiment, the UE 115 may determine a CSI reporting configuration for the at least one secondary carrier based at least in part on the determination that the at least one secondary carrier is dormant for a predetermined time period. In some cases, the configuration may comprise averaging the channel measurements from the at least one time period. In some cases, the configuration may comprise reporting CSI based on measurements for the at least one secondary carrier during the predetermined time period. In some cases, the reported CSI may comprise one or more of channel measurements of the at least one secondary carrier, interference measurements of the at least one secondary carrier, or a combination thereof.

Figure 13A:
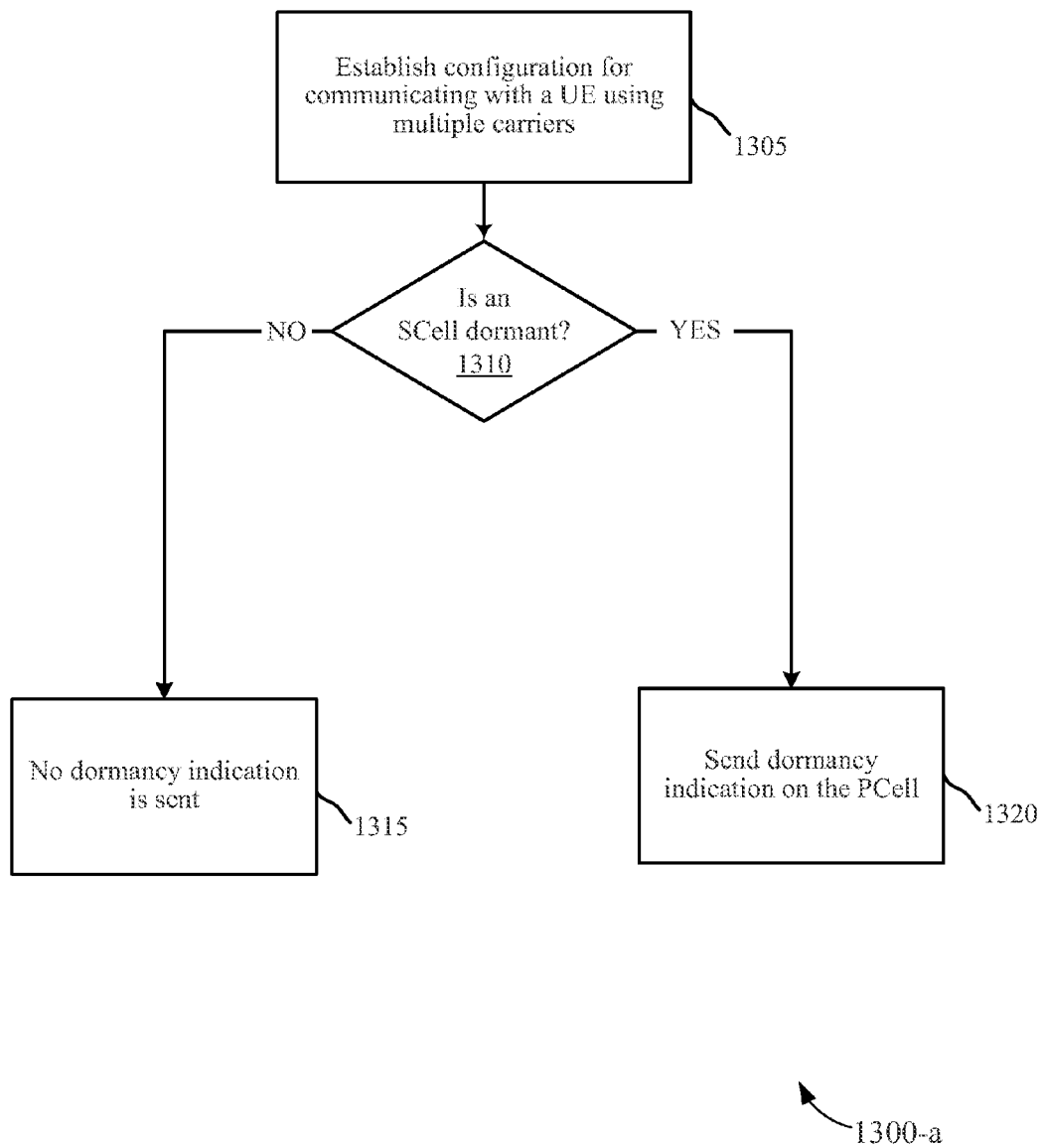
FIG. 13A shows a flowchart illustrating a method for reducing the overhead signaling for dormant carriers in a wireless communication system at a base station in accordance with various embodiments.

FIG. 13A is a flowchart 1300-a illustrating a method for dynamic cell mode indication in a carrier aggregation environment in accordance with various embodiments. The steps in this flowchart may be accomplished by components of a base station 105 with reference to FIGS. 1, 2, and 10, or device 900 with reference to FIG. 9.

At block 1305, a cell serving a UE may establish a configuration for communication with the UE using multiple carriers. In one embodiment, the serving cell may establish, at a base station, a configuration for communication with at least one UE using a plurality of carriers including a primary carrier and one or more secondary carriers. At block 1310, the serving cell may determine whether a secondary carrier (e.g., an SCell) will be dormant.

At block 1315, if no carrier is dormant, no indication may be sent. In one embodiment, the serving cell may omit transmission of an indication that the at least one secondary carrier from the one or more secondary carriers is non-dormant for a predetermined time period.

At block 1320, if a secondary cell is dormant, the serving cell may determine whether to send an indication to the UE that the secondary cell is dormant. In one embodiment, an indication may be transmitted by a cell different from the secondary cell. For example, if an SCell is dormant, the PCell may transmit the indication over a primary carrier. In one embodiment, the primary cell may indicate, such as periodically or aperiodically, to the at least one UE that at least one secondary carrier from the one or more secondary carriers is dormant. In one embodiment, these steps may be accomplished by the dormancy indication module 915. In one embodiment, the primary cell may transmit an indication that the at least one secondary carrier from the one or more secondary carriers is dormant for a predetermined time period. In some cases, this may comprise transmitting downlink control information (DCI) in a search space associated with the secondary carrier. The search space may comprise a common or UE-specific search space for the at least one UE. In one embodiment, the DCI is transmitted according to DCI Format 1C.

Figure 13B:
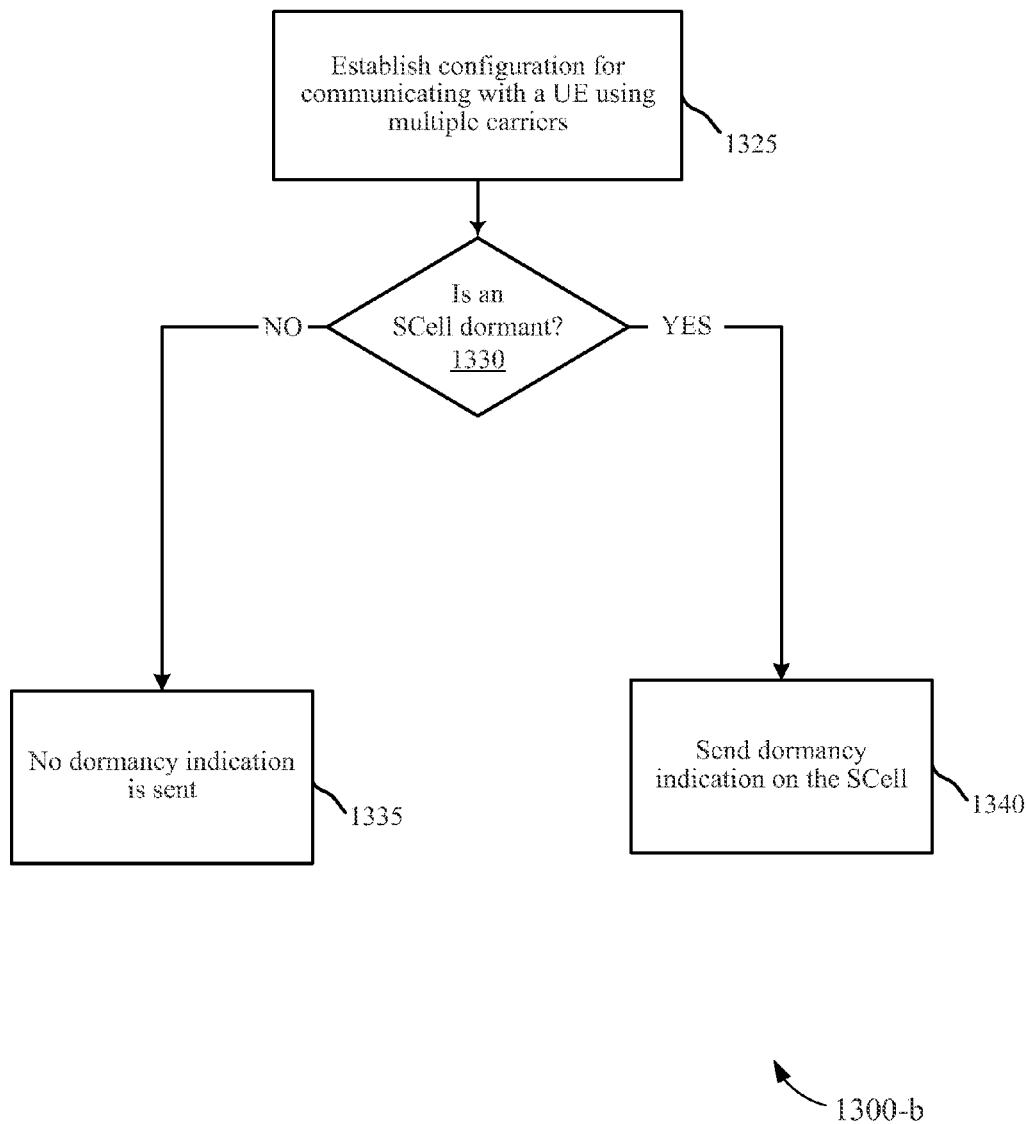
FIG. 13B shows a flowchart illustrating a method for reducing the overhead signaling for dormant carriers in a wireless communication system at a base station in accordance with various embodiments.

FIG. 13B is a flowchart 1300-b illustrating a method for dynamic cell mode indication in a carrier aggregation environment in accordance with various embodiments. The steps in this flowchart may be accomplished by components of a base station 105 with reference to FIGS. 1, 2, and 10, or device 900 with reference to FIG. 9.

At block 1325, a cell serving a UE may establish a configuration for communication with the UE using multiple carriers. In one embodiment, the serving cell may establish, at a base station, a configuration for communication with at least one UE using a plurality of carriers including a primary carrier and one or more secondary carriers. At block 1330, the serving cell may determine whether a cell (e.g., an SCell) will be dormant.

At block 1335, if no cell is dormant, no indication may be sent. In one embodiment, the serving cell may omit transmission of an indication that the at least one secondary carrier from the one or more secondary carriers is non-dormant for a predetermined time period.

At block 1340, if a secondary cell is dormant, the secondary cell that will be dormant may send an indication to UEs served by the secondary cell that it is dormant. In one embodiment, the secondary cell may transmit the indication of dormancy over a secondary carrier associated with secondary cell. In another embodiment, the dormant secondary cell may omit transmitting a dormancy indication over the secondary carrier, and UEs may infer in response to the absence of the signal that the secondary carrier is dormant. In one embodiment, the secondary cell may indicate, such as periodically or aperiodically, to the at least one UE that at least one secondary carrier from the one or more secondary carriers is dormant. In one embodiment, this may be accomplished by the dormancy indication module 915. In one embodiment, the transmitter 920 may transmit an indication that the at least one secondary carrier from the one or more secondary carriers is dormant for a predetermined time period. In some cases, this may comprise transmitting downlink control information (DCI) in a search space associated with the secondary carrier. The search space may comprise a common or UE-specific search space for the at least one UE. In one embodiment, the DCI is transmitted according to DCI Format 1C.

Figure 14:
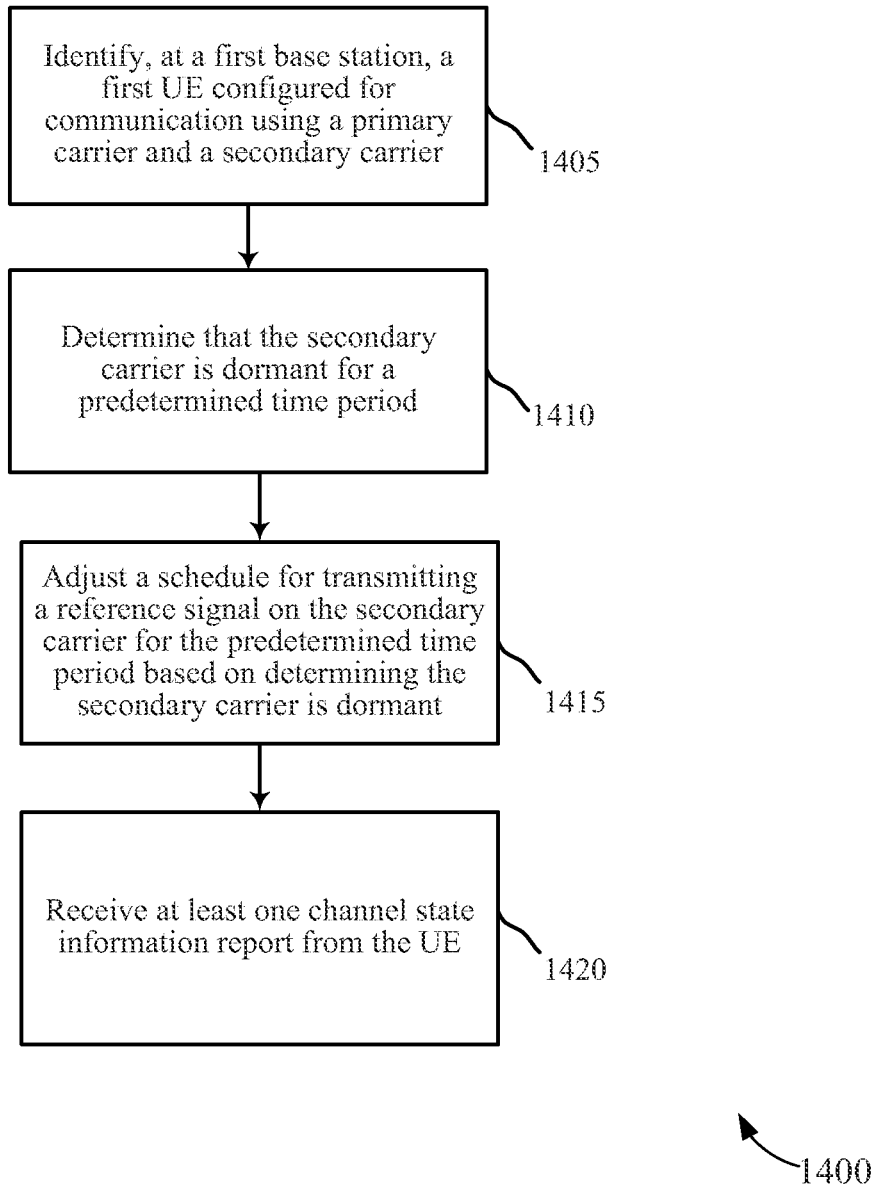
FIG. 14 shows a flowchart illustrating a method for reducing the overhead signaling for dormant carriers in a wireless communication system at a base station in accordance with various embodiments.

FIG. 14 is a flowchart 1400 illustrating a method for adjusting reference signal transmission for a dormant cell in a carrier aggregation environment in accordance with various embodiments. The steps in this flowchart may be accomplished by components of a base station 105 with reference to FIGS. 1, 2, and 10, or device 900 with reference to FIG. 9.

At block 1405, a serving cell may identify a UE configured for communication using multiple carriers. In some examples, the serving cell may be a serving base station for a primary carrier and a secondary carrier of the multiple carriers. In other examples, the serving cell may be the serving base station for the secondary carrier and the primary carrier may be transmitted by a second base station.

At block 1410, the serving cell may determine that the secondary carrier is dormant. In one embodiment, the secondary carrier may be dormant for a predetermined time period. At block 1415, the serving cell may adjust a schedule for transmitting a reference signal (e.g., CRS, CSI-RS, PRS, etc.). In some cases, the reference signal is transmitted on the secondary carrier and the schedule is adjusted for the predetermined time period based on determining the secondary carrier is dormant. In one embodiment, adjusting the schedule includes reducing a frequency, such as a temporal frequency, of transmission of the reference signal based on determining the secondary carrier is dormant. In some examples, adjusting the schedule for reference signals includes transmitting CSI-RS with different periodicity or offset than in non-dormant time periods. For example, CSI-RS may be transmitted during burst periods for time periods when the secondary cell is dormant, as described above. In some cases, the method may further include determining that the secondary carrier is no longer dormant, and increasing a temporal frequency of transmission of the reference signal based on determining that the secondary carrier is no longer dormant.

In some examples, the UE may be configured with a CSI reporting configuration for the time period where the secondary carrier is dormant that includes a different configuration for measuring and reporting based on CSI-RS signals than when the secondary carrier is not dormant. In one embodiment, at block 1420, the serving cell may receive at least one CSI report from the UE, which may include CSI reporting for the predetermined time period where the secondary carrier is dormant. The at least one CSI report may be received according to the CSI reporting configuration for the predetermined time period that the secondary carrier is dormant. In some cases, the at least one CSI report may include information related to a neighboring secondary carrier for the predetermined time period.

The detailed description set forth above in connection with the appended drawings describes exemplary embodiments and does not represent the only embodiments that may be implemented or that are within the scope of the claims. The term "exemplary" used throughout this description means "serving as an example, instance, or illustration," and not "preferred" or "advantageous over other embodiments." The detailed description includes specific details for the purpose of providing an understanding of the described techniques. These techniques, however, may be practiced without these specific details. In some instances, well-known structures and devices are shown in block diagram form in order to avoid obscuring the concepts of the described embodiments.

Information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, multiple microprocessors, one or more microprocessors in conjunction with a DSP core, or any other such configuration.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items, such as prefaced by "at least one of," indicates a disjunctive list such that, for example, a list of "at least one of A, B, or C" means A or B or C or AB or AC or BC or ABC (i.e., A and B and C).

Computer-readable media includes both computer storage media and communication media including any medium that facilitates transfer of a computer program from one place to another. A storage medium may be any available medium that can be accessed by a general purpose or special purpose computer. By way of example, and not limitation, computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk and blu-ray disc where disks usually reproduce data magnetically, while discs reproduce data optically with lasers. Combinations of the above are also included within the scope of computer-readable media.

The previous description of the disclosure is provided to enable a person skilled in the art to make or use the disclosure. Various modifications to the disclosure will be readily apparent to those skilled in the art, and the generic principles defined herein may be applied to other variations without departing from the spirit or scope of the disclosure. Throughout this disclosure the term "example" or "exemplary" indicates an example or instance and does not imply or require any preference for the noted example. Thus, the disclosure is not to be limited to the examples and designs described herein but is to be accorded the widest scope consistent with the principles and novel features disclosed herein.

Techniques described herein may be used for various wireless communications systems such as CDMA, TDMA, FDMA, OFDMA, SC-FDMA, and other systems. The terms "system" and "network" are often used interchangeably. A CDMA system may implement a radio technology such as CDMA2000, Universal Terrestrial Radio Access (UTRA), etc. CDMA2000 covers IS-2000, IS-95, and IS-856 standards. IS-2000 Releases 0 and A are commonly referred to as CDMA2000 1X, 1X, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM). An OFDMA system may implement a radio technology such as Ultra Mobile Broadband (UMB), Evolved UTRA (E-UTRA), IEEE 802.11 (Wi-Fi), IEEE 802.16 (WiMAX), IEEE 802.20, Flash-OFDM, etc. UTRA and E-UTRA are part of Universal Mobile Telecommunication System (UMTS). 3GPP Long Term Evolution (LTE) and LTE-Advanced (LTE-A) are new releases of UMTS that use E-UTRA. UTRA, E-UTRA, UMTS, LTE, LTE-A, and GSM are described in documents from an organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. The description above, however, describes an LTE system for purposes of example, and LTE terminology is used in much of the description above, although the techniques are applicable beyond LTE applications.

What is claimed is:

1. A method of wireless communication at a user equipment (UE) comprising:
    determining that at least one secondary carrier is dormant; and
    determining a channel state information (C SI) reporting configuration for the at least one secondary carrier based at least in part on the determination that the at least one secondary carrier is dormant, wherein the CSI reporting configuration comprises reporting CSI during a dormant time period of the at least one secondary carrier, the CSI being based on measurements for the at least one secondary carrier.

2. The method of claim 1, further comprising:
    determining a CSI reference signal (CSI-RS) measurement configuration for the at least one secondary carrier for the dormant time period of the at least one secondary carrier;
    performing CSI-RS measurements for the at least one secondary carrier during the dormant time period according to the CSI reference signal (CSI-RS) measurement configuration; and
    reporting CSI for the dormant time period further based on the CSI-RS measurements and the determined CSI reporting configuration.

3. The method of claim 2, wherein the determining the CSI-RS measurement configuration comprises:
    determining a schedule for CSI-RS transmissions on the at least one secondary carrier based at least in part on a discovery reference signal configuration for the at least one secondary carrier.

4. The method of claim 1, further comprising:
    measuring at least one CSI reference signal (CSI-RS) of a neighboring secondary carrier during the dormant time period of the at least one secondary carrier; and
    reporting CSI further based on the at least one CSI-RS measurement of the neighboring secondary carrier and the determined CSI reporting configuration.

5. The method of claim 4, wherein the neighboring secondary carrier is identified for measuring the at least one CSI-RS during the dormant time period based at least in part on a physical cell index of the neighboring secondary carrier.

6. The method of claim 1, wherein the reported CSI comprises one or more of channel measurements of the at least one secondary carrier, interference measurements of the at least one secondary carrier, or a combination thereof.

7. A method of wireless communication at a first base station comprising:
    identifying, at the first base station, a first user equipment (UE) configured for communication using a primary carrier and a secondary carrier;
    determining that the secondary carrier is dormant; and
    adjusting a schedule for transmitting a reference signal on the secondary carrier for at least one dormant time period of the secondary carrier; and
    receiving a CSI report during a dormant time period of the at least one secondary carrier, wherein the CSI report is based on measurements for the secondary carrier.

8. The method of claim 7, wherein the reference signal comprises one or more of a cell-specific reference signal (CRS), a channel state information reference signal (CSI-RS), a positioning reference signal (PRS), or a combination thereof.

9. The method of claim 7, wherein adjusting the schedule comprises:
reducing a temporal frequency of transmission of the reference signal based on determining that the secondary carrier is dormant.

10. The method of claim 7, wherein the primary carrier is transmitted by a second base station.

11. The method of claim 7, further comprising:
receiving at least one channel state information (CSI) report from the UE, wherein the at least one CSI report comprises information related to a neighboring secondary carrier for the dormant time period of the secondary carrier.

12. A method of wireless communication at a first base station, comprising:
identifying a first user equipment (UE) configured for communication using a primary carrier and a secondary carrier;
determining that the secondary carrier is dormant; and
adjusting a schedule for transmitting a reference signal on the secondary carrier for at least one dormant time period of the secondary carrier, wherein the adjusting the schedule for transmitting the reference signal comprises determining a transmission schedule for a channel state information reference signal (CSI-RS) based on a discovery reference signal configuration for the secondary carrier.

13. The method of claim 12, wherein the reference signal comprises one or more of a cell-specific reference signal (CRS), a channel state information reference signal (CSI-RS), a positioning reference signal (PRS), or a combination thereof.

14. The method of claim 12, wherein adjusting the schedule comprises:
reducing a temporal frequency of transmission of the reference signal based on determining that the secondary carrier is dormant.

15. The method of claim 12, wherein the primary carrier is transmitted by a second base station.

16. The method of claim 12, further comprising:
receiving at least one channel state information (CSI) report from the UE, wherein the at least one CSI report comprises information related to a neighboring secondary carrier for the dormant time period of the secondary carrier.

17. An apparatus for wireless communication at a user equipment (UE), comprising:
means for determining that at least one secondary carrier is dormant; and
means for determining a channel state information (C SI) reporting configuration for the at least one secondary carrier based at least in part on the determination that the at least one secondary carrier is dormant, wherein the CSI reporting configuration comprises reporting CSI during a dormant time period of the at least one secondary carrier, the CSI being based on measurements for the at least one secondary carrier.

18. The apparatus of claim 17, further comprising:
means for determining a CSI reference signal (CSI-RS) measurement configuration for the at least one secondary carrier for the dormant time period of the at least one secondary carrier;
means for performing CSI-RS measurements for the at least one secondary carrier during the dormant time period according to the CSI reference signal (CSI-RS) measurement configuration; and
means for reporting CSI for the dormant time period further based on the CSI-RS measurements and the determined CSI reporting configuration.

19. The apparatus of claim 18, wherein the means for determining the CSI-RS measurement configuration comprises:
means for determining a schedule for CSI-RS transmissions on the at least one secondary carrier based at least in part on a discovery reference signal configuration for the at least one secondary carrier.

20. The apparatus of claim 17, further comprising:
means for measuring at least one CSI reference signal (CSI-RS) of a neighboring secondary carrier during the dormant time period of the at least one secondary carrier; and
means for reporting CSI further based on the at least one CSI-RS measurement of the neighboring secondary carrier and the determined CSI reporting configuration.

21. The apparatus of claim 20, wherein the neighboring secondary carrier is identified for measuring the at least one CSI-RS during the dormant time period based at least in part on a physical cell index of the neighboring secondary carrier.

22. The apparatus of claim 17, wherein the reported CSI comprises one or more of channel measurements of the at least one secondary carrier, interference measurements of the at least one secondary carrier, or a combination thereof.

23. An apparatus for wireless communication at a first base station, comprising:
means for identifying a first user equipment (UE) configured for communication using a primary carrier and a secondary carrier;
means for determining that the secondary carrier is dormant;
means for adjusting a schedule for transmitting a reference signal on the secondary carrier for at least one dormant time period of the secondary carrier; and
means for receiving a channel state information (C SI) report from the UE during a dormant time period of the at least one secondary carrier, wherein the CSI report is based on measurements for the secondary carrier.

24. The apparatus of claim 23, wherein the reference signal comprises one or more of a cell-specific reference signal (CRS), a channel state information reference signal (CSI-RS), a positioning reference signal (PRS), or a combination thereof.

25. The apparatus of claim 23, wherein the means for adjusting the schedule reduces a temporal frequency of transmission of the reference signal based on determining that the secondary carrier is dormant.

26. The apparatus of claim 23, wherein the primary carrier is transmitted by a second base station.

27. The apparatus of claim 23, further comprising:
means for receiving at least one channel state information (CSI) report from the UE, wherein the at least one CSI report comprises information related to a neighboring secondary carrier for the dormant time period of the secondary carrier.

28. An apparatus for wireless communication at a first base station, comprising:
means for identifying a first user equipment (UE) configured for communication using a primary carrier and a secondary carrier;

means for determining that the secondary carrier is dormant; and means for adjusting a schedule for transmitting a reference signal on the secondary carrier for at least one dormant time period of the secondary carrier, wherein the means for adjusting the schedule for transmitting the reference signal comprises means for determining a transmission schedule for a channel state information reference signal (CSI-RS) based on a discovery reference signal configuration for the secondary carrier.

29. The apparatus of claim 28, wherein the reference signal comprises one or more of a cell-specific reference signal (CRS), a channel state information reference signal (CSI-RS), a positioning reference signal (PRS), or a combination thereof.

30. The apparatus of claim 28, wherein the means for adjusting the schedule reduces a temporal frequency of transmission of the reference signal based on determining that the secondary carrier is dormant.

31. The apparatus of claim 28, wherein the primary carrier is transmitted by a second base station.

32. The apparatus of claim 28, further comprising:
means for receiving at least one channel state information (CSI) report from the UE, wherein the at least one CSI report comprises information related to a neighboring secondary carrier for the dormant time period of the secondary carrier.

33. An apparatus for wireless communication at a user equipment (UE), in a system comprising:
a processor;
memory in electronic communication with the processor; and
instructions stored in the memory and operable, when executed by the processor, to cause the apparatus to:
determine that at least one secondary carrier is dormant; and
determine a channel state information (CSI) reporting configuration for the at least one secondary carrier based at least in part on the determination that the at least one secondary carrier is dormant, wherein the CSI reporting configuration comprises reporting CSI during a dormant time period of the at least one secondary carrier, the CSI being based on measurements for the at least one secondary carrier.

34. The apparatus of claim 33, wherein the code is further executable by the processor to cause the apparatus to:
determine a CSI reference signal (CSI-RS) measurement configuration for the at least one secondary carrier for the dormant time period of the at least one secondary carrier;
perform CSI-RS measurements for the at least one secondary carrier during the dormant time period according to the CSI reference signal (CSI-RS) measurement configuration; and
report CSI for the dormant time period further based on the CSI-RS measurements and the determined CSI reporting configuration.

35. The apparatus of claim 34, wherein the determining the CSI-RS measurement configuration comprises:
determining a schedule for CSI-RS transmissions on the at least one secondary carrier based at least in part on a discovery reference signal configuration for the at least one secondary carrier.

36. The apparatus of claim 33, wherein the code is further executable by the processor to cause the apparatus to:

measure at least one CSI reference signal (CSI-RS) of a neighboring secondary carrier during the dormant time period of the at least one secondary carrier; and
report CSI further based on the at least one CSI-RS measurement of the neighboring secondary carrier and the determined CSI reporting configuration.

37. The apparatus of claim 36, wherein the neighboring secondary carrier is identified for measuring the at least one CSI-RS during the dormant time period based at least in part on a physical cell index of the neighboring secondary carrier.

38. The apparatus of claim 33, wherein the reported CSI comprises one or more of channel measurements of the at least one secondary carrier, interference measurements of the at least one secondary carrier, or a combination thereof.

39. An apparatus for wireless communication at a first base station, in a system comprising:
a processor;
memory in electronic communication with the processor; and
instructions stored in the memory and operable, when executed by the processor, to cause the apparatus to:
identify a first user equipment (UE) configured for communication using a primary carrier and a secondary carrier;
determine that the secondary carrier is dormant;
adjust a schedule for transmitting a reference signal on the secondary carrier for at least one dormant time period of the secondary carrier; and
receive a channel state information (CSI) report from the UE during a dormant time period of the at least one secondary carrier, wherein the CSI report is based on measurements for the secondary carrier.

40. The apparatus of claim 39, wherein the reference signal comprises one or more of a cell-specific reference signal (CRS), a channel state information reference signal (CSI-RS), a positioning reference signal (PRS), or a combination thereof.

41. The apparatus of claim 39, wherein adjusting the schedule comprises:
reducing a temporal frequency of transmission of the reference signal based on determining that the secondary carrier is dormant.

42. The apparatus of claim 39, wherein the primary carrier is transmitted by a second base station.

43. The apparatus of claim 39, wherein the instructions are further executable by the processor to cause the apparatus to:
receive at least one channel state information (CSI) report from the UE, wherein the at least one CSI report comprises information related to a neighboring secondary carrier for the dormant time period of the secondary carrier.

44. An apparatus for wireless communication at a first base station, in a system comprising:
a processor;
memory in electronic communication with the processor; and
instructions stored in the memory and operable, when executed by the processor, to cause the apparatus to:
identify a first user equipment (UE) configured for communication using a primary carrier and a secondary carrier;
determine that the secondary carrier is dormant; and
adjust a schedule for transmitting a reference signal on the secondary carrier for at least one dormant time period of the secondary carrier, wherein the adjusting the schedule for transmitting the reference signal comprises determining a transmission schedule for a channel state information reference signal (CSI-RS) based on a discovery reference signal configuration for the secondary carrier.

45. The apparatus of claim 44, wherein the reference signal comprises one or more of a cell-specific reference signal (CRS), a channel state information reference signal (CSI-RS), a positioning reference signal (PRS), or a combination thereof.

46. The apparatus of claim 44, wherein adjusting the schedule comprises:
reducing a temporal frequency of transmission of the reference signal based on determining that the secondary carrier is dormant.

47. The apparatus of claim 44, wherein the primary carrier is transmitted by a second base station.

48. The apparatus of claim 44, wherein the instructions are further executable by the processor to cause the apparatus to:
receive at least one channel state information (CSI) report from the UE, wherein the at least one CSI report comprises information related to a neighboring secondary carrier for the dormant time period of the secondary carrier.

49. A non-transitory computer readable medium storing code for wireless communication at a user equipment (UE), the code comprising instructions executable by a processor to:
determine that at least one secondary carrier is dormant; and
determine a channel state information (CSI) reporting configuration for the at least one secondary carrier based at least in part on the determination that the at least one secondary carrier is dormant, wherein the CSI reporting configuration comprises reporting CSI during a dormant time period of the at least one secondary carrier, the CSI being based on measurements for the at least one secondary carrier.

50. A non-transitory computer readable medium storing code for wireless communication at a base station, the code comprising instructions executable by a processor to:
identify a first user equipment (UE) configured for communication using a primary carrier and a secondary carrier;
determine that the secondary carrier is dormant;
adjust a schedule for transmitting a reference signal on the secondary carrier for at least one dormant time period of the secondary carrier; and
receive a channel state information (CSI) report from the UE during a dormant time period of the at least one secondary carrier, wherein the CSI report is based on measurements for the secondary carrier.

51. A non-transitory computer readable medium storing code for wireless communication at a base station, the code comprising instructions executable by a processor to:
identify a first user equipment (UE) configured for communication using a primary carrier and a secondary carrier;
the instructions are further executable to determine that the secondary carrier is dormant; and
adjust a schedule for transmitting a reference signal on the secondary carrier for at least one dormant time period of the secondary carrier, wherein the adjusting the schedule for transmitting the reference signal comprises determining a transmission schedule for a channel state information reference signal (CSI-RS) based on a discovery reference signal configuration for the secondary carrier.

* * * * *